US012516494B2

(12) United States Patent
Young

(10) Patent No.: US 12,516,494 B2
(45) Date of Patent: Jan. 6, 2026

(54) SYSTEMS AND METHODS OF DETERMINING ACTUATOR BRAKE CAPACITY

(71) Applicant: Doosan Bobcat North America, Inc., West Fargo, ND (US)

(72) Inventor: Christopher Young, Fargo, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 0 days.

(21) Appl. No.: 19/116,922

(22) PCT Filed: Nov. 5, 2024

(86) PCT No.: PCT/US2024/054545
§ 371 (c)(1),
(2) Date: Mar. 28, 2025

(87) PCT Pub. No.: WO2025/101502
PCT Pub. Date: May 15, 2025

(65) Prior Publication Data
US 2025/0297448 A1   Sep. 25, 2025

Related U.S. Application Data

(60) Provisional application No. 63/597,908, filed on Nov. 10, 2023.

(51) Int. Cl.
*E02F 3/42* (2006.01)
*E02F 9/20* (2006.01)

(52) U.S. Cl.
CPC ............. *E02F 3/422* (2013.01); *E02F 9/207* (2013.01); *E02F 9/2095* (2013.01)

(58) Field of Classification Search
CPC .......... E02F 3/422; E02F 9/207; E02F 9/2095
See application file for complete search history.

(56) References Cited

U.S. PATENT DOCUMENTS 10,633,824 B2    4/2020   Bruyer et al.
2013/0334999 A1  12/2013  Kim
(Continued)

FOREIGN PATENT DOCUMENTS

| CN | 116815843 A   | 9/2023 |
| JP | 2010138586 A  | 6/2010 |
| WO | 2009019826 A1 | 2/2009 |

OTHER PUBLICATIONS

International Searching Authority—EPO, International Search Report and Written Opinion, mailed Feb. 25, 2025, for corresponding International App. No. PCT/US2024/054545 [12 pgs.].

*Primary Examiner* — Kyle J Kingsland
(74) *Attorney, Agent, or Firm* — Quarles & Brady, LLP

(57) ABSTRACT

Methods and systems for controlling and understanding brake capabilities of an actuator for power machines are provided. One system may include activating a brake of an electric actuator to maintain a position. While the brake is activated, the system may adjust an electric current of the electric actuator. While the electric current of the electric actuator is adjusted, the system may monitor for positional deviations from the first position. When a positional deviation is detected, the system may determine a present electric current of the electric actuator and determine, based on the present electric current, a performance metric for the brake of the electric actuator.

17 Claims, 12 Drawing Sheets

(56) References Cited

U.S. PATENT DOCUMENTS

2017/0217413 A1* 8/2017 Kutzner ................ B60T 13/662
2021/0270004 A1* 9/2021 Durkin .................... E02F 3/422
2024/0383458 A1* 11/2024 Schmidtlein ............ B60T 8/321

* cited by examiner

SYSTEMS AND METHODS OF DETERMINING ACTUATOR BRAKE CAPACITY

CROSS-REFERENCE TO RELATED APPLICATIONS

This application is a U.S. national stage application of International Application No. PCT/US2024/054545, filed Nov. 5, 2024, which claims the benefit of and priority to U.S. Provisional Application No. 63/597,908, filed Nov. 10, 2023, the entireties of which are incorporated by reference herein.

BACKGROUND

This disclosure is directed toward power machines. More particularly, the present disclosure is directed to power machines that operate in whole or in part under electrical power. Power machines, for the purposes of this disclosure, include any type of machine that generates power for the purpose of accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

The discussion above is merely provided for general background information and is not intended to be used as an aid in determining the scope of the claimed subject matter.

SUMMARY OF THE DISCLOSURE

The technology disclosed herein relates to electric power machines, including monitoring and analysis of actuator brake performance (e.g., capacity) for electric power machines. In particular, the technology disclosed herein relates to systems and methods of controlling an electric current of an electric actuator. The technology disclosed herein may analyze and determine a performance metric, such as, e.g., a holding capacity, for a corresponding brake of the electric actuator based on a positional deviation, a trace of the electric current of the electric actuator over time, etc. The performance metric (e.g., holding capacity) may be provided to an operator of the power machine such that the operator may be informed as to a holding capacity or other performance characteristic of the brake. For example, such information may be informative to scheduling maintenance and repair (including preventative maintenance) for the power machine. Additionally, such information may be informative as to whether a power-down sequence (e.g., an E-Stop sequence) may be performed while a load is elevated.

Accordingly, the technology disclosed herein provides methods and systems for controlling and understanding brake capabilities of an actuator, such as, e.g., an electric actuator with an external brake.

Some configurations of the present disclosure provide a system for controlling an electric power machine. The system may include one or more electronic processors in electrical communication with an electric actuator of the electric power machine. The one or more electronic processors may be configured to receive a request to perform a power-down sequence for the electric power machine or the electric actuator, while the electric actuator is in a first position corresponding to a first electric current of the electric actuator. The one or more electronic processors may be configured to, in response to receiving the request: engage a brake of the electric actuator; and, after engaging the brake, reduce an electric current of the electric actuator below the first electric current. The one or more electronic processors may be configured to, during reduction of the electric current, monitor a position of the electric actuator to detect a positional deviation of the electric actuator from the first position. The one or more electronic processors may be configured to, responsive to detecting the positional deviation, control the electric actuator by increasing the electric current of the electric actuator to oppose a further change in the position of the electric actuator.

In some examples, the one or more electronic processors may be configured to: detect the positional deviation based on determining whether a difference between a present position of the electric actuator and the first position exceeds a threshold; and, responsive to the difference remaining within the threshold, fully removing power from the electric actuator as part of the power-down sequence for the electric power machine.

In some examples, the one or more electronic processors may be configured to continuously reduce the electric current of the electric actuator until the change in the position is detected or the electric current is reduced to zero.

In some examples, the one or more electronic processors may be configured to, responsive to detecting the positional deviation: stop the power-down sequence for the electric power machine; and provide a notification that the power-down sequence was stopped.

In some examples, the one or more electronic processors may be configured to: determine a present electric current of the electric actuator when the positional deviation is detected; and determine, based on the present electric current, a holding capacity for the brake.

In some examples, the one or more electronic processors may be configured to: detect a fault condition for the brake based on the determined holding capacity for the brake and an expected holding capacity for the brake.

In some examples, the electric actuator may be an electric lift actuator of a lift arm assembly and the first position may be a first lift position.

Some configurations of the present disclosure provide a method for controlling an electric power machine. The method may include receiving, with one or more electronic processors, a request to perform a power-down sequence for the electric power machine or the electric actuator, while the electric actuator is in a first position corresponding to a first electric current of the electric actuator. The method may include, in response to receiving the request: engaging, with the one or more electronic processors, a brake of the electric actuator; and after engaging the brake, reducing, with the one or more electronic processors, an electric current of the electric actuator below the first electric current. The method may include, during reduction of the electric current, monitoring, with the one or more electronic processors, a position of the electric actuator to detect a positional deviation of the electric actuator from the first position. The method may include, responsive to detecting the positional deviation, controlling, with the one or more electronic processors, the electric actuator by increasing the electric current of the electric actuator to oppose a further positional deviation of the electric actuator.

Some configurations of the present disclosure provide a system for controlling an electric power machine. The system may include one or more electronic processors in electrical communication with an electric actuator of the electric power machine. The one or more electronic processors may be configured to activate a brake of the electric actuator to maintain a holding position of the electric actuator. The one or more electronic processors may be configured to, with the brake activated, increase an electric current of the electric actuator. The one or more electronic processors may be configured to monitor a position of the electric actuator to detect a positional deviation of the electric actuator resulting from the increase in the electric current. The one or more electronic processors may be configured to determine a present electric current of the electric actuator when the positional deviation is detected. The one or more electronic processors may be configured to determine, based on the present electric current, a performance metric for the brake of the electric actuator.

In some examples, the one or more electronic processors may be configured to: detect a fault condition when the present electric current of the electric actuator is below a threshold; and provide a fault warning to an operator of the electric power machine when the fault condition is detected.

In some examples, the performance metric may be a present holding capacity of the brake.

In some examples, the one or more electronic processors may be configured to: after detecting the positional deviation: continue to provide electric current to the electric actuator over an amount of time, to move the electric actuator to a subsequent holding position of the electric actuator; and determine a dynamic brake capacity for the brake based on the provided electric current.

In some examples, the one or more electronic processors may be configured to: after increasing the electric current and monitoring the position, decrease the electric current of the electric actuator such that movement of the electric actuator may be prevented by the brake.

In some examples, the one or more electronic processors may be configured to: determine, based on the performance metric, a force threshold for the electric actuator, where the force threshold may represent a maximum holding capacity of the brake; and control, based on the force threshold, a subsequent electric current of the electric actuator such that the subsequent electric current may be maintained within the force threshold to prevent an over-loading event for the brake.

Some configurations of the present disclosure provide a method for controlling an electric power machine. The method may include activating, with one or more electronic processors, a brake of the electric actuator to maintain a holding position of the electric actuator. The method may include, with the brake activated, increasing, with the one or more electronic processors, an electric current of the electric actuator. The method may include monitoring, with the one or more electronic processors, a position of the electric actuator to detect a positional deviation of the electric actuator resulting from the increase in the electric current. The method may include determining, with the one or more electronic processors, a present electric current of the electric actuator when the positional deviation is detected. The method may include determining, with the one or more electronic processors, based on the present electric current, a performance metric for the brake of the electric actuator.

Some configurations of the present disclosure provide a system for controlling an electric power machine. The system may include one or more electronic processors in electrical communication with an electric actuator of the electric power machine. The one or more electronic processors may be configured to activate a brake of the electric actuator to maintain a first position of the electric actuator. The one or more electronic processors may be configured to adjust an electric current of the electric actuator while the brake of the electric actuator is activated. The one or more electronic processors may be configured to, while the electric current of the electric actuator is adjusted, monitor the first position of the electric actuator to detect a positional deviation from the first position. The one or more electronic processors may be configured to determine a present electric current of the electric actuator corresponding to the detected positional deviation. The one or more electronic processors may be configured to determine, based on the present electric current of the electric actuator, a performance metric for the brake of the electric actuator.

In some examples, the one or more electronic processors may be configured to adjust the electric current by reducing the electric current until the positional deviation is detected or the electric current is substantially equal to zero.

In some examples, the one or more electronic processors may be configured to adjust the electric current of the electric actuator by decreasing the electric current of the electric actuator.

In some examples, the one or more electronic processors may be configured to: responsive to detecting the positional deviation, control the electric actuator of the electric power machine by increasing the electric current of the electric actuator to maintain a second position of the electric actuator that results from the positional deviation from the first position.

In some examples, the one or more electronic processors may be configured to adjust the electric current of the electric actuator by increasing the electric current of the electric actuator.

In some examples, the one or more electronic processors may be configured to adjust the electric current of the electric actuator based on operator input provided via an operator input device.

In some examples, the one or more electronic processors may be configured to adjust the electric current of the electric actuator in accordance with a pre-determined sequence of electric current adjustments for the electric actuator.

Some configurations of the present disclosure provide a method for controlling an electric power machine. The method may include activating, with one or more electronic processors, a brake of the electric actuator to maintain a first position of the electric actuator. The method may include adjusting, with the one or more electronic processors, an electric current of the electric actuator while the brake of the electric actuator is activated. The method may include, while the electric current of the electric actuator is adjusted, monitoring, with the one or more electronic processors, the first position of the electric actuator to detect a positional deviation from the first position. The method may include determining, with the one or more electronic processors, a present electric current of the electric actuator corresponding to the detected positional deviation. The method may include determining, with the one or more electronic processors, based on the present electric current of the electric actuator, a performance metric for the brake of the electric actuator.

Some configurations described herein provide an electric power machine with control systems as presented above, or with control systems configured to implement methods as presented above.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

The following drawings are provided to help illustrate various features of examples of the disclosure and are not intended to limit the scope of the disclosure or exclude alternative implementations.

DETAILED DESCRIPTION OF THE PRESENT DISCLOSURE

Figure 1:
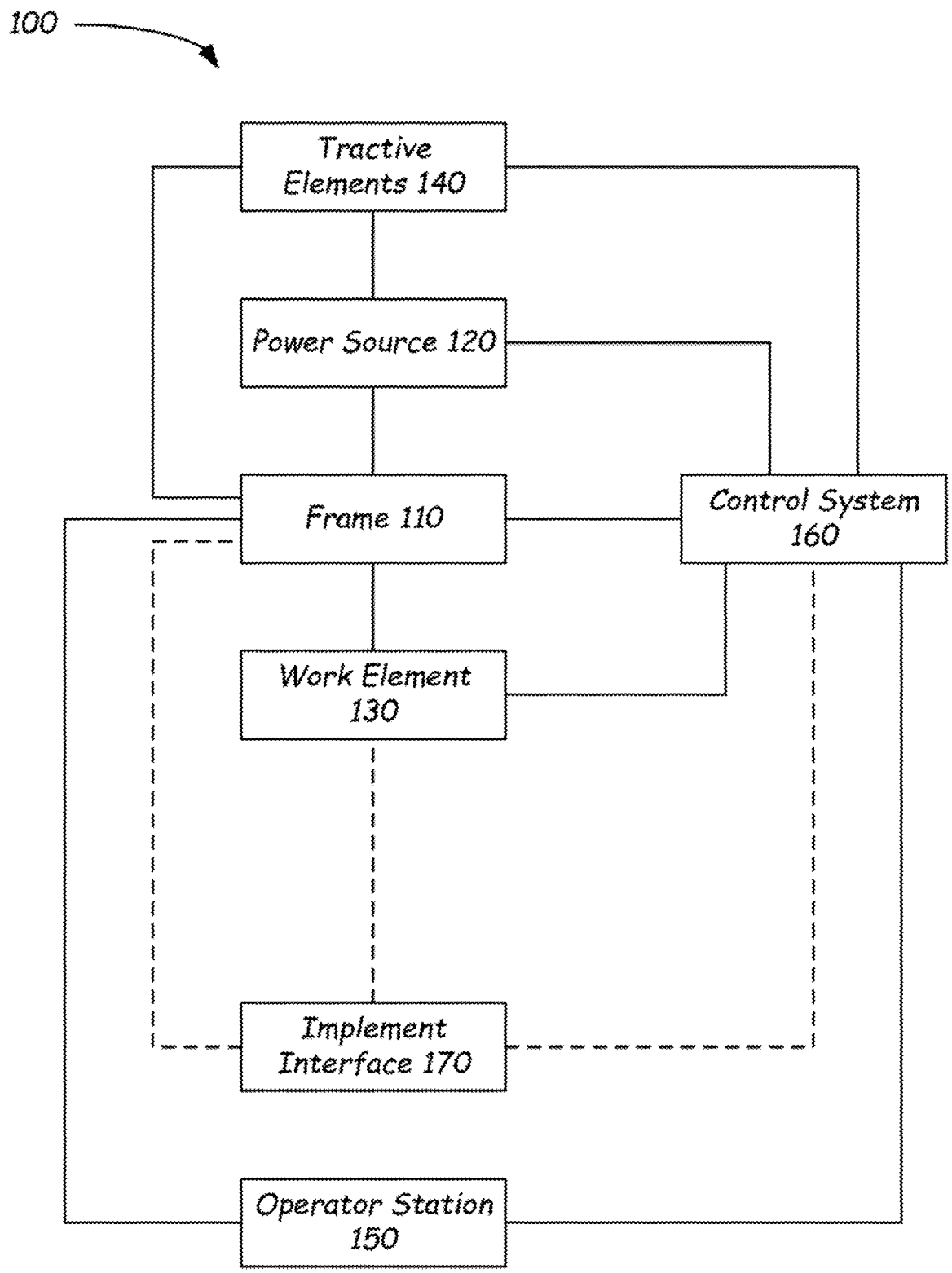
FIG. 1 is a block diagram illustrating functional systems of a representative power machine on which configurations of the present disclosure can be advantageously practiced.

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

While the power machines disclosed herein may be embodied in many different forms, several specific embodiments are discussed herein with the understanding that the embodiments described in the present disclosure are to be considered only exemplifications of the principles described herein, and the technology disclosed herein is not intended to be limited to the embodiments illustrated.

Some discussion below describes improved components and configurations for power machines, including components and configurations that use electrical (e.g., as opposed to hydraulic) power to operate certain power machine components or otherwise implement certain power machine functionality. In some configurations, electrically powered components can be mounted to a frame of a power machine to selectively move work elements of the power machine, including lift arms or implement carriers. In some configurations, electrically powered components can provide motive power for a power machine, including for tracked power machines (e.g., compact tracked loaders).

The technology disclosed herein relates to electric power machines, including analysis of actuator brake capacity of electric power machines. In particular, the technology disclosed herein relates to systems and methods of controlling an electric current of an electric actuator. The technology disclosed herein may analyze and determine a performance metric, such as, e.g., a holding capacity, for a corresponding brake of the electric actuator based on the positional deviation, the level of electric current provided to or drawn by the electric actuator over time, or other factors (e.g., as further detailed below). The performance metric (e.g., holding capacity) may be provided to an operator of the power machine such that the operator may be informed as to a holding capacity of the brake or other relevant information. For example, notification regarding holding capacity may be informative regarding the scheduling or implementation of maintenance and repair (including preventative maintenance) for the power machine. Additionally, such information may be informative regarding potential movement of a power machine, and of a workgroup of the power machine in particular, during a power-down sequence. For example, some implementations can be used to determine whether a power-down sequence (e.g., an E-Stop sequence) may be performed while a load is elevated (e.g., raised by a lift arm of a workgroup).

Accordingly, the technology disclosed herein provides methods and systems for controlling and understanding brake capabilities of an actuator, such as, e.g., an electric actuator with an external or other brake. In this regard, examples below may refer particularly to single or multiple brakes. It should be recognized that the various methods and control systems described can be used interchangeably with any variety of brake systems, including systems with single brakes and single actuators, systems multiple brakes and single actuators, and systems with multiple brakes and multiple actuators. Accordingly, discussion herein is intended to apply broadly to various actuator and brake systems, despite particular system arrangements being discussed in particular examples.

In some instances, the technology disclosed herein includes a control method that utilizes the position of the actuator and force generated by the actuator motor (e.g., as indicated by electric current) to determine the load holding capability of the actuator brake. This approach can also be used as a method to prevent a load from inadvertently lowering when the brakes (or brake) are applied (e.g., when power delivery is ceased for a relevant actuator). For example, when a load is held by an actuator without brakes and the velocity of the actuator is close to zero, a particular electric current may be required at the actuator to hold the load. In some cases, the disclosed method may determine whether the load can be held by the brake(s), in the absence of current to the relevant actuator. When the brake(s) cannot hold the load, the technology disclosed herein may in some cases actively supplement the brakes and alert the operator of the condition.

In some examples, the load may be fully held by the actuator and the commanded velocity of the actuator may be zero. Further the brakes may be applied to the actuator. With the brakes applied, the electric current in the actuator can be reduced over a time period and, as the electric current is reduced, the position of the actuator can be monitored. If the position of the actuator changes, that change can be detected (e.g., using a position sensor of the actuator) and the technology disclosed herein may correspondingly determine that the actuator brakes are not holding the load. In such a case, the electric current in the actuator at which the movement of the actuator is detected can be proportional to the force the brakes are able to hold—or, more specifically, a difference between the actual load on the actuator from the workgroup and the load applied by the actuator (as indicated by current) may correspond to the load capacity of the brakes. In some cases, the electric current in the actuator can be increased when movement is detected in order to keep the load from further movement (e.g., to hold the load steady, in combination with the brakes). In some instances, the operator can be notified of the condition.

As another example, the technology disclosed herein may provide a control method that uses the position of the actuator and force generated by the actuator motor (e.g., electric current) to determine the load holding capability of the actuator brake. This control method may be implemented, for example, when the actuator(s) can generate more force than the brakes are able to hold. In summary, with the brakes holding position, the electric current to a corresponding actuator can be increased until the force from the actuator overcomes the holding capability of the brakes. For example, when the actuator position changes, the electric current at which the position change occurred can be recorded and associated with the holding capacity of the brakes. This electric current level can then be considered to be proportional to the static brake holding capability (e.g., (e.g., with the actual holding capacity corresponding to the force applied by the actuator to overcome the brake, offset by the gravitational force of the weight of the workgroup or any other non-brake load overcome by the actuator). Further, continued movement of the actuator despite the holding force of the brakes can provide an indicator of a dynamic braking holding capability of the brakes, which may differ in some cases from the static braking holding capability.

Figure 2:
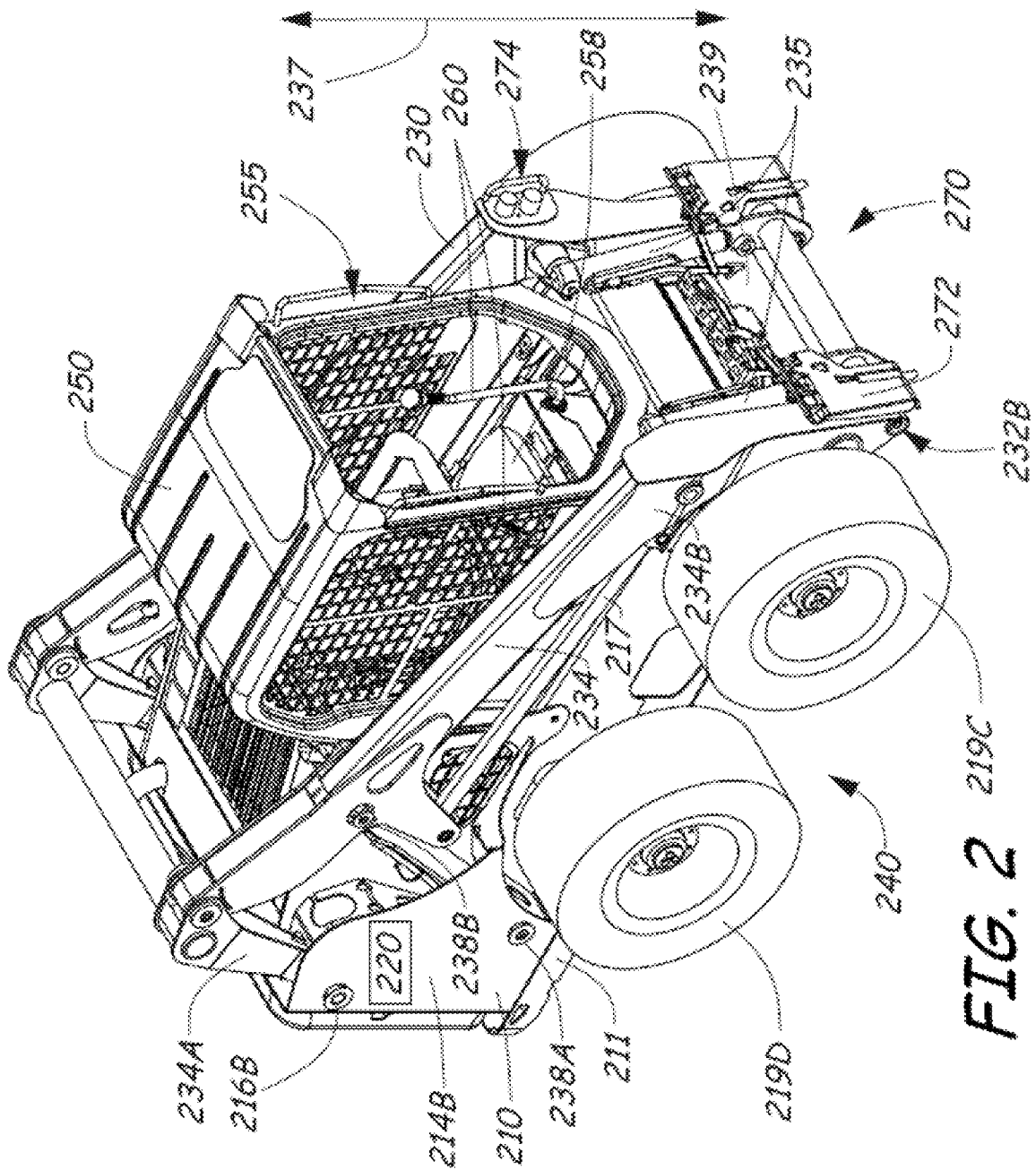
FIG. 2 is a perspective view showing generally a front of a power machine on which configurations disclosed in this specification can be advantageously practiced.
Figure 3:
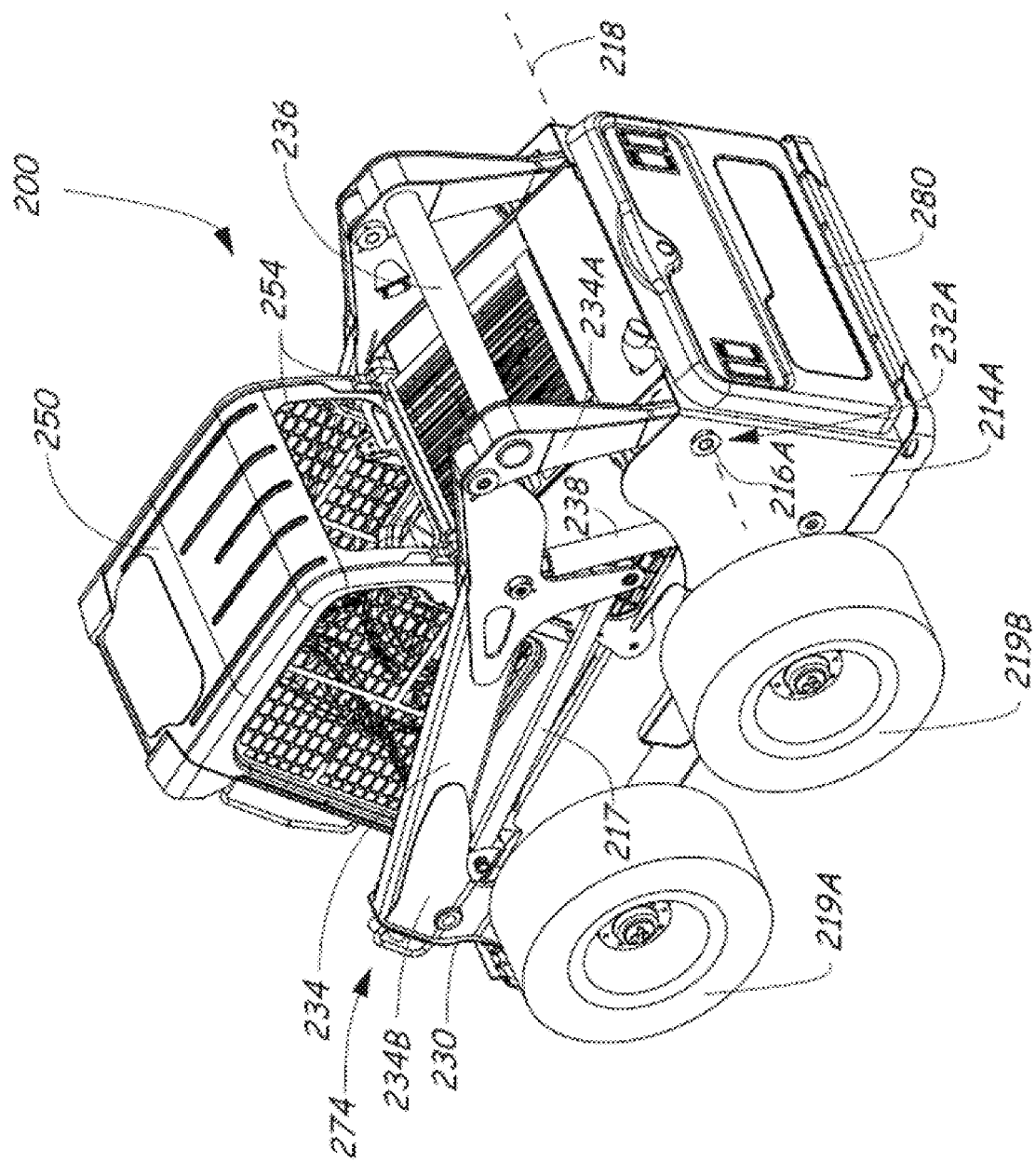
FIG. 3 is a perspective view showing generally a back of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e., not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electric sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. For example, the power machine can be a mower with a mower deck or other mower component as a work element, which may be movable with respect to the frame of the mower. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e., from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e., remote from both of the power machine and any implement to which is it coupled) that is capable of controlling at least some of the operator-controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements. Correspondingly, although some example power machines discussed herein are presented as skid-steer power machines, some embodiments disclosed herein can be implemented on a variety of other power machines. For example, some embodiments can be implemented on compact loaders or compact excavators that do not accomplish turns via skidding.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electric signals, hydraulic signals, and/or mechanical signals. Signals generated in response to operator input devices are provided to various components on the power machine for controlling various functions on the power machine. Among the functions that are controlled via operator input devices on power machine 200 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed herein can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e., the lift arm assembly can be raised and lowered) under control of the loader 200 with respect to the frame 210 along a lift path 237 that forms a generally vertical path along which the lift arm assembly can be raised or lowered. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end 232A of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e., along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 230. The implement interface 270 includes an implement carrier 272 that is capable of accepting and securing a variety of different implements to the lift arm 234. Such implements have a complementary machine interface that is configured to be engaged with the implement carrier 272. The implement carrier 272 is pivotally mounted at the second end 232B of the lift arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes power coupler (s) 274 available for connection to an implement on the lift arm assembly 230. The power coupler(s) 274 includes pressurized hydraulic fluid port to which an implement can be removably coupled. The pressurized hydraulic fluid port selectively provides pressurized hydraulic fluid for powering one or more functions or actuators on an implement. The power coupler can also include an electric power source for powering electric actuators and/or an electronic controller on an implement. The power coupler(s) 274 also exemplarily includes electric conduits that are in communication with a data bus on the excavator 200 to allow communication between a controller on an implement and electronic devices on the loader 200.

Frame 210 supports and generally encloses the power system 220 so that the various components of the power system 220 are not visible in FIGS. 2-3. The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 4:
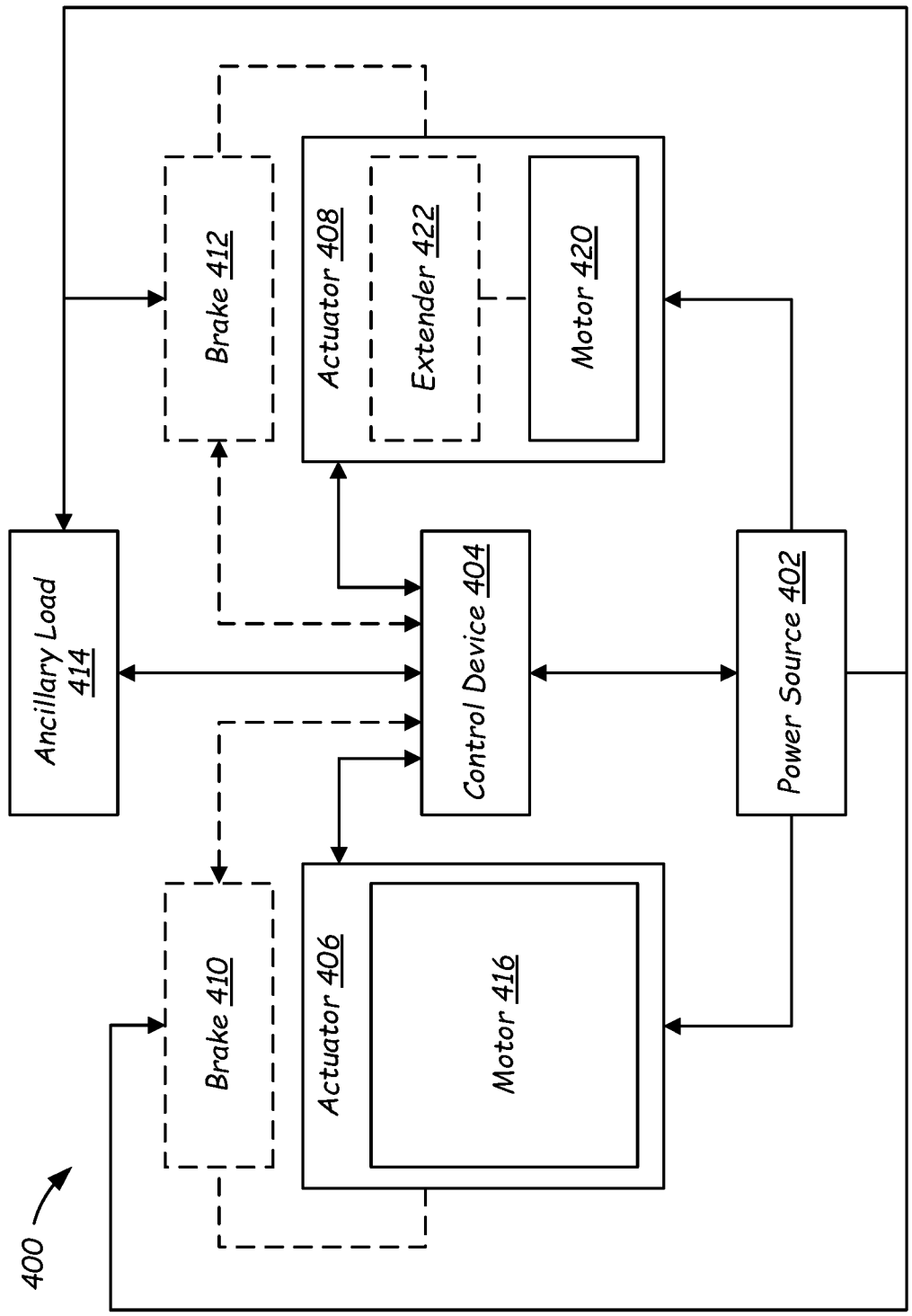
FIG. 4 is a block diagram illustrating components of a power system of the loader of FIGS. 2 and 3 or other power machines.

FIG. 4 shows a schematic illustration of a block diagram of a power machine 400, which can be any of a number of different types of power machines (e.g., wheeled or tracked skid-steer loaders), including any of the types generally discussed above. To accomplish various work and drive operations, the power machine 400 can include a power source 402, a control device 404, and electric actuators 406, 408. Either or both of the electric actuators 406, 408 can be variously configured as one or more drive actuators, or one or more workgroup actuators, and a different number of individual actuators can be provided than is generally shown in FIG. 4. For example, as further discussed below, some power machines can include a left-side and right-side drive actuators, each including a respective electronic drive motor disposed to power an associate tractive element (e.g., an endless track assembly), as well as various extendable (or other) work actuators (e.g., one or more extendable lift arm actuators, one or more extendable tilt actuators, etc.). In some cases, as also shown in FIG. 4, one or more brakes 410, 412 can be configured to stop movement of an associated one or more of the actuators 406, 408, including based on control signals from the control device 404.

In the illustrated example, the power machine 400 can be an electrically powered power machine and thus the power source 402 can include an electric power source such as, for example, a battery pack that includes one or more battery cells (e.g., lithium-ion batteries). In some embodiments, the power source 402 can include other electric storage devices (e.g., a capacitor), and other power sources. In addition, the power machine 400 can, but need not, include an internal combustion engine that provides, via a generator, electric power to the power source 402 (e.g., to charge one or more batteries of the electric power source).

Generally, the control device 404 can be implemented in a variety of different ways and can include one or more types or instances of known electronic controllers. For example, the control device 404 can be implemented as known types of processor devices, (e.g., microcontrollers, field-programmable gate arrays, programmable logic controllers, logic gates, etc.), including as part of one or more general or special purpose computers. In addition, the control device 404 can also include or be in operative communication with other computing components, including memory, inputs, output devices, etc. (not shown). In this regard, the control device 404 can be configured to implement some or all of the operations of the processes described herein, which can, as appropriate, be retrieved from or otherwise interact with memory. In some embodiments, the control device 404 can include multiple control devices (or modules) that can be integrated into a single component or arranged as multiple separate components. In some embodiments, the control device 404 can be part of a larger control system (e.g., the control system 160 of FIG. 1) and can accordingly include or be in electronic communication with a variety of control modules, including hub controllers, engine controllers, drive controllers, and so on.

In different embodiments, different types of actuators can be configured to operate under power from the power source 402, including electric actuators configured as rotary actuators, linear actuators, and combinations thereof. In the example shown in FIG. 4, the actuator 406 is a drive actuator and includes an electric motor 416 that is configured to provide rotational power to one or more tractive elements (not shown in FIG. 4). As noted above, some power machines can include multiple drive actuators, including as can be arranged for skid-steer operation.

Also as shown in the example of FIG. 4, the actuator 408 is a workgroup actuator and thus includes an electric motor 420 that is configured to provide rotational power for operation of one or more non-drive work elements (e.g., a lift arm, an implement, etc.). In some cases, the motor 420 can be configured to power movement of an extender 422 (e.g., a lead screw, a ball screw, another similar threaded assembly, or other known components for rotationally powered non-rotational movement), which can convert rotational power of the motor 420 into translational movement of the extender 422 so as to provide translational power to a work element of the power machine 400. For example, the motor 420 can rotate in a first direction to drive extension of the extender 422 and can rotate in a second direction to drive retraction of the extender 422 when the motor rotates in a second rotational direction opposite the first rotational direction. In this way, and depending on how the electric actuator 406 is coupled to the components of the power machine 400, extension (and retraction) of the electric actuator 406 can, for example, raise (or lower) a lift arm of the power machine 400, change an attitude an implement of the power machine 400 (e.g., a bucket), etc.

Thus, generally, each motor 416, 420 can be controlled to implement particular functionality for the power machine 400. As generally noted above, different configurations of multiple drive or workgroup actuators can be included in some cases (e.g., multiple instances of the actuators 406, 408 as shown), to provide different functionality for a particular power machine. For example, in some configurations, the power machine 400 can include an electric actuator that is a first lift actuator on a first lateral side of the power machine 400, an electric actuator that is a second lift actuator on a second lateral side of the power machine 400, an electric actuator that is a first tilt actuator that is on a first lateral side of the implement interface of the power machine 400, an electric actuator that is a second tilt actuator that is on a second lateral side of the implement interface of the power machine 400, an electric actuator that is a first drive actuator for a first drive system that is on (or otherwise powers one or more tractive elements for) the first lateral side of the power machine 400, and an electric actuator that is a second drive actuator for a second drive system that is on (or otherwise powers one or more tractive elements for) the second lateral side of the power machine 400.

As also noted above, the brakes 410, 412 can be coupled to (e.g., included in) the respective electric actuators 406, 408 in some embodiments. In this regard, a wide variety of known brake systems can be used. For example, one or more brakes can be a mechanical brake that includes a mechanical stop that can be moved into engagement to block movement of a relevant extender or relevant motor, in one or more directions, and can be moved out of engagement to allow movement of the relevant extender or motor. In some cases, a mechanical brake can include an arm that contacts a lead screw of an extender to block further movement of the lead screw. In some embodiments, one or more electrically powered brakes can be provided (i.e., brake assemblies that include one or more electric actuators for application of braking force).

As shown in FIG. 4, the power source 402 can be electrically connected to the control device 404, the electric actuators 406, 408, and the brakes 410, 412 (as appropriate), as well as one or more ancillary loads 414. Thus, the power source 402 can provide power to each motor 416, 420 to drive movement (e.g., extension and retraction) of the respective extenders 418, 422, to the control device 404, to each brake 410, 412 (as appropriate), to each of the ancillary load(s) 414, etc. Further, the power source 402 can provide power to the ancillary loads 414 (i.e., loads not associated with providing tractive or workgroup power) for various ancillary functionality. For example, ancillary loads 414 can include a climate control system (e.g., including a heater, an air-conditioning system, a fan, etc.), a sound system (e.g., a speaker, a radio, etc.), etc. In some cases, ancillary loads 414 may be treated with lower priority according to certain power management modes.

As shown in FIG. 4, the control device 404 can be in electrical communication with the power source 402, the actuators 406, 408, the brakes 410, 412 (as appropriate), and the ancillary load(s) 414, and can adjust (e.g., limit) the power delivered from the power source 402 to, or the power consumed by, each of these electric loads (or others). For example, as appropriate, the control device 404 can adjust (e.g., decrease) the power delivered to each of these electric loads by adjusting (e.g., decreasing) the electric current that can be consumed by at least some of these electric loads. In some cases, the control device 404 can adjust the electric current delivered to an electric load by adjusting a driving signal delivered to an electric current source (e.g., a voltage controlled electric current source) that can be electrically connected to the electric load (e.g., integrated within a power electronics driver board, such as a motor driver) to deliver electric current to the electric load. For example, the electric current source can include one or more field-effect transistors, and the driving signal can be the voltage applied to the one or more field-effect transistors to adjust the electric current delivered and thus the power delivered to the electric load (e.g., the motor).

In some embodiments, similarly to each of the electric loads of the power machine 400, the electric power source of the power source 402 can include (or can be otherwise electrically connected to) an electric current source (e.g., a power electronics board) that adjusts (e.g., and can restrict) the amount of power to be delivered to the electric loads of the power machine 400. In this case, the control device 404 can adjust the driving signal to the electric power source to adjust the total amount of electric current and thus the amount of power delivered to the electric loads of the power machine 400. For example, the control device 404 can adjust the output from the electric power source 402 to regulate the torque, position, direction, and speed of one or more motors powered by the power source 402.

In some embodiments, the control device 404 can be configured to determine a present (i.e., temporally current) power usage of one or more actuators or other electric loads, or a present power delivery from a power source. In some cases, a present power usage or delivery can be measured instantaneously. In some cases, a present power usage or delivery can be measured as an average power delivery over a recent time interval (e.g., a preceding 2 seconds). Thus, for example, the control device 404 can determine a present power usage for each electric load of the power machine 400, or can determine a present power delivery from the electric power source of the power source 402.

In some cases, each electric load of the power machine 400, and the power source 402 can include or can otherwise be electrically connected to an electric current sensor to determine the electric current being provided to (or by) the particular electric component, and a voltage being provided to (or by) the particular electric component can also be determined (e.g., based on voltage sensor or a fixed voltage provided by the power source 402). In this way, for example, the control device 404 can receive information about a present voltage and a present electric current that is delivered to each individual electric load, or about the present voltage and electric current that is supplied by the electric power source of the power machine 400 in total and can thereby determine a present power usage for relevant (e.g., all) electric loads and for the electric power source of the power machine 400.

In some embodiments, the control device 404 can determine a present power usage for the electric power source of the power machine 400 by adding the present power usage for each relevant electric load of the power machine 400 (e.g., as determined by multiplying electric current and voltage for the loads). Alternatively, for example, power can be determined by multiplying the torque and speed of one or more relevant motors. In certain circumstances, it may be advantageous to use either of these known methods. In other cases, the control device 404 can determine a present power usage of the electric power source of the power machine 400 only by determining the power delivered by the electric power source. For example, the control device 404 can receive a present value for electric current delivered by the electric power source 402 and, based on the voltage of the electric power source 402, can then determine a total present power usage for the electric power source. In some cases, the control device 404 can assume a substantially constant voltage for the electric power source and can then determine the present power usage of the electric power source by using the constant voltage and the present electric current value.

In some embodiments, the electric power source 402 can include or can be electrically connected to a sensor to sense a present remaining energy of the electric power source. In some cases, for example, a voltage sensor can sense the voltage of the electric power source, which can be indicative of the present remaining energy left within the electric power source (e.g., because the voltage of the electric power source can be related to the present remaining energy within the electric power source). Any suitable means for sensing the remaining energy of the electric power source can be used, including an accounting of how much electric current is supplied by the energy storage device over time.

Figure 5:
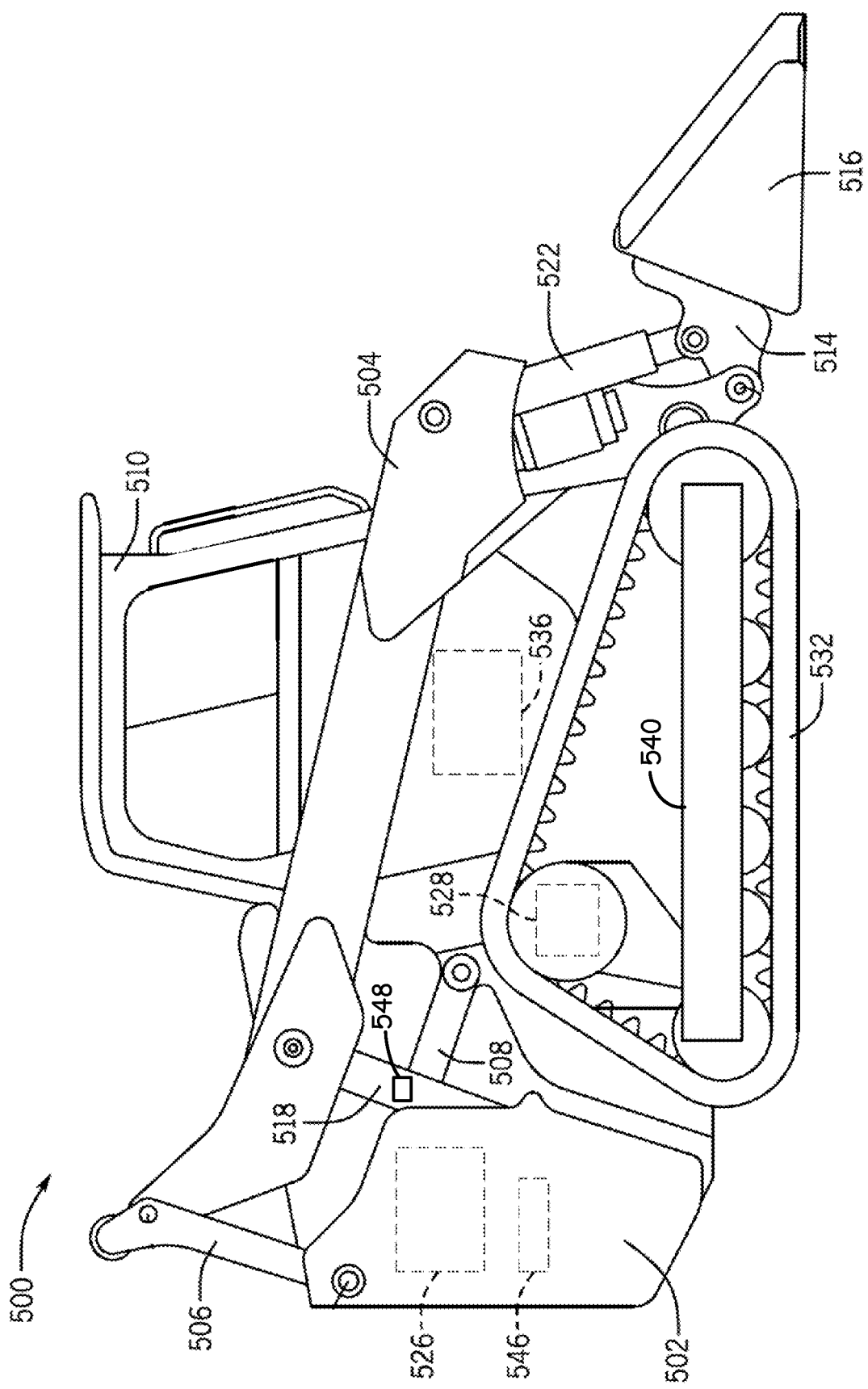
FIG. 5 is a side elevation view showing certain components of a power machine in the form of an electrically powered compact tracked loader according to configurations of the disclosure.

In some embodiments, the power machine 400 can include one or more sensors that can sense various aspects of the power machine 400. For example, the power machine 400 can include a torque sensor for one or more electric actuators, to sense a present torque of the one or more electric actuator. In some cases, the torque sensor can be the same as the electric current sensor electrically connected to the electric actuator (e.g., because electric current is related to the torque). As another example, the power machine 400 can include a position sensor for one or more extenders or other components of one or more electric actuators (as appropriate), including as may sense a present extension amount for an extender of an electric actuator (e.g., relative to the housing of the electric actuator). In some cases, this can be a hall-effect sensor, a rotary encoder for the motor (e.g., which can be used to determine the extension amount of actuators with extenders), an optical sensor, etc. In some cases, as shown in FIG. 5, the power machine 400 can include a resolver 548 configured to track relative movement of the actuator 518. As yet another example, the power machine 400 can include an angle sensor for one or more pivotable joints (e.g., of the lift arm) to determine a current orientation of the lift arm (and any implement coupled thereto). As yet another example, the power machine 400 can include a speed sensor or an acceleration sensor (e.g., an accelerometer) to respectively determine a current speed or a current acceleration of the entire power machine 400 or of a component thereof. As still yet another example, the power machine 400 can include an inclinometer (e.g., an accelerometer) that can sense the current attitude of a mainframe of the power machine 400 with respect to gravity.

FIG. 5 shows a side isometric view of an electrically powered power machine 500 with a lift arm in a fully lowered position, which can be a specific implementation of the power machine 200, the power machine 400, etc. As shown in FIG. 5, the power machine 500 can include a main frame 502, a lift arm 504 coupled to the main frame via a follower link 506, a driver link 508 pivotally coupled to the lift arm 504 and the main frame 502, an operator enclosure 510 (e.g., a cab, as shown), an implement interface 514 coupled to an end of the lift arm 504, an implement 516 (e.g., a bucket as shown) coupled to the implement interface 514, an electric lift actuator 518, an electric tilt actuators 522, an electric power source 526, a drive system 528 (e.g., including an electric drive motor), a traction devices 532 (e.g., an endless track, as shown), and a climate control system 536 (e.g., as generally representative of an ancillary electric load). In some embodiments, a suspension system 540 (e.g., a torsional suspension system) can be included, to provide improved ride control and overall smoothness of travel. As generally noted above, similar (e.g., substantially identical) other components can be provided symmetrically (or otherwise) on an opposing lateral side of the power machine 500 in some cases, including another electric lift actuator, another electric tilt actuator, etc.

In some cases, the electric power source 526 can be implemented in a similar manner as the previously described power sources (e.g., the power source 402). Thus, the electric power source 526 can include a battery pack including one or more batteries. In general, the electric power source 526 can supply power to some or all of the electric loads of the power machine 500. For example, the electric power source 526 can provide power to the lift electric actuator 518, the electric tilt actuator 522, the drive system 528, the climate control system 536, etc.

The power machine 500 can also include a control device 546 (e.g., a general or special purpose electronic computer or other electronic controller) that can be in communication with the power source 526 and some (or all) of the electric loads of the power machine 500, as appropriate. For example, the control device 546 can be in communication with the lift electric actuator 518, the electric tilt actuator 522, the drive system 528, the climate control system 536, etc. In this way, the control device 546 can control operation of these components, or related other systems, to adjust how power is routed to each of these electric loads (e.g., depending on the criteria defined by a particular power management mode) and, correspondingly, how these components operate under power from the power source 526.

Figure 6:
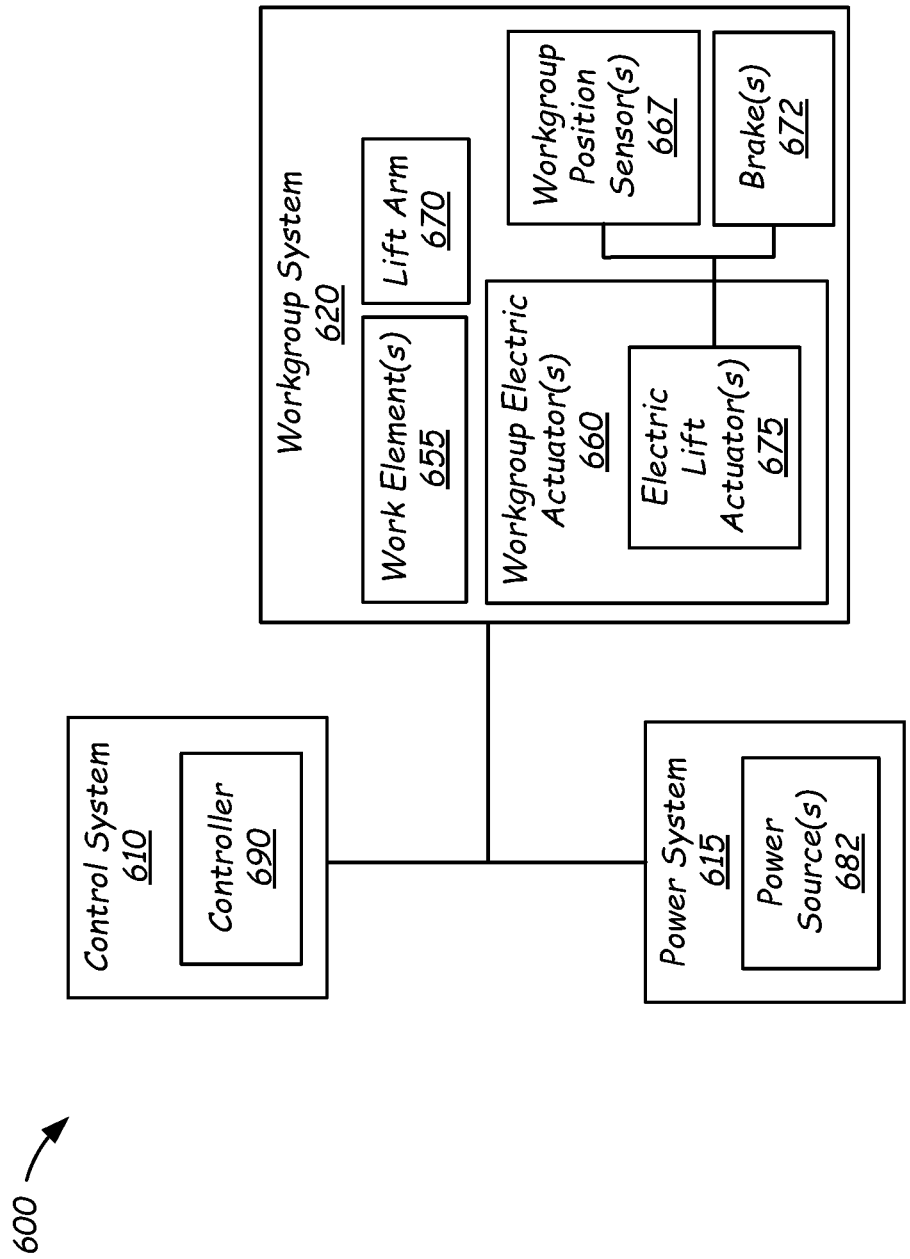
FIG. 6 is a block diagram of a power machine according to some configurations.

FIG. 6 schematically illustrates a power machine 600 according to some configurations. In the example illustrated in FIG. 6, the power machine 600 includes a control system 610 (e.g., the control system 160, as described herein), a power system 615, and a workgroup system 620. The control system 610, the power system 615, and the workgroup system 620 communicate over one or more communication lines or buses. The power machine 600 may include additional, fewer, or different components than those illustrated in FIG. 6 in various configurations and may perform additional functionality than the functionality described herein. For example, the power machine 600 may include additional, similar, or different components, systems, and functionality as described above with respect to the power machine 100 of FIG. 1, the loader 200 of FIGS. 2-3, the power machine 400 of FIG. 4, the electric power machine 500 of FIG. 5, or another power machine described herein.

As illustrated in FIG. 6, the power machine 600 includes the workgroup system 620, which can in some cases be a lift arm structure (as further discussed in examples herein). In the illustrated example, the workgroup system 620 may include one or more work elements 655 (e.g., the work element 130 of FIG. 1, the bucket 516 of FIG. 5, or another attached implement), one or more workgroup electric actuators 660, one or more workgroup position sensors 667, a lift arm 670 (e.g., the lift arm assembly 230 or a component thereof, as described herein), and one or more brakes 672 (e.g., the brakes 410, 412 of FIG. 4 as described herein). In examples, below, use of the brake 672 as a single brake is discussed in particular. However, other arrangements can be similarly implemented with multiple brakes (e.g., via simultaneous or other concurrent control of two brakes for a single actuator or workgroup component).

In the illustrated example, the workgroup electric actuator 660 of the workgroup system 620 includes one or more electric lift actuators 675. Generally, lift actuators corresponding to the electric lift actuator(s) 675 are described in greater detail herein with respect to FIGS. 1-5. In examples, below, use of the actuator 675 as a single actuator is discussed in particular. However, other arrangements can be similarly implemented with multiple actuators (e.g., via simultaneous or other concurrent control of two lift actuators for a single workgroup component). Further, although some examples herein focus on lift actuators, similar implementation for other types of actuators is also possible.

The brake 672 can be configured to stop movement of an associated one or more of the workgroup electric actuators 660, including, e.g., based on control signals from the control system 610. The brake 672 can be coupled to (e.g., included in) the respective workgroup electric actuator 660 in some embodiments. However, in some instances, the brake 672 can be separate components connected to the respective workgroup electric actuator 660, as illustrated in FIG. 6. Generally, the brake 672 are described in greater detail herein with respect to FIGS. 1-5.

The brake 672 may be associated with a holding capacity (or other performance metric), such as, e.g., an expected holding capacity and a present holding capacity. An expected holding capacity may represent a holding capacity of the brake 672 as manufactured or indicated in a specification of the brake 672 (e.g., a maximum load rating for the brake 672 as originally manufactured). However, as the brake 672 is used, the brake 672 may undergo wear, which may decrease the holding capacity of the brake 672. Accordingly, the present holding capacity may represent an actual holding capacity of the brake 672 that may be lower than an original (e.g., expected) holding capacity. In some configurations, the actual holding capacity may represent a maximum holding capacity for the brake 672 (e.g., which is smaller than an original holding capacity for the brake 672).

The workgroup position sensors 667 can be configured to measure a linear extension or angular orientation of an actuator or other component of a workgroup. For example, the workgroup position sensors 667 can be configured to measure lift arm position (e.g., height, extension, etc.). In some examples, one or more of the workgroup position sensors 667 can be integrated into one or more of the workgroup electric actuators 660 (e.g., can be included as part of the electric lift actuator(s) 675). However, in some instances, the workgroup position sensors 667 can be separate components connected to the respective workgroup electric actuator 660, as illustrated in FIG. 6.

The workgroup position sensor(s) 667 may collect position data for the power machine 600 (or a component thereof). As one example, the workgroup position sensor 667 may be associated with one of the workgroup electric actuators 660, and may detect position data for the associated workgroup electric actuator 660. For example, the workgroup position sensors 667 may measure or otherwise indicate rotational position data for an electric servo motor (e.g., which may correspond to a particular lift height or other workgroup configuration, according to known geometric relationships between the motor and associated workgroup components). As another example, the workgroup position sensors 667 may be associated with extenders of the workgroup electric actuators 660 (e.g., ball screws or other motor-driven extenders). Accordingly, in some configurations, the workgroup position sensors 667 may sense a present extension amount (as position data) for the extender of each workgroup electric actuator 660 (e.g., an extension distance relative to a housing of the workgroup electric actuator 660). In some cases, the workgroup position sensor 667 may be a hall-effect sensor, a rotary encoder for the motor (e.g., which can be used to determine the extension amount of actuators with extenders), an optical sensor, etc. Accordingly, in some configurations, position data may include a lift height of the lift arm 670 or the work element 655, an extension amount associated with the electric lift actuator 675, or the like.

The power machine 600 may also include the power system 615 (e.g., the power system 120 of FIG. 1, the power system 220 of FIG. 2, etc.). In the illustrated example of FIG. 6, the power system 615 may include one or more power sources 682. As described herein, the power system 615 (via one or more of the power sources 682) may generate or otherwise provide electric power for operating various functions on the power machine 600 (or components thereof). The power system 615 may provide electric power to various components of the power machine 600, such as, e.g., one or more components of the control system 610, the workgroup system 620, or the like. Accordingly, the power machine 600 can be an electrically powered power machine (e.g., an electric power machine) and, thus, the power source(s) 682 of the power system 615 can include electric power sources, such as, e.g., a battery pack that includes one or more battery cells (e.g., lithium-ion batteries). In some configurations, the power system 615 can include other electric storage devices (e.g., a capacitor), and other power sources. Alternatively, or in addition, the power machine 600 can, but need not, include an internal combustion engine that provides, via a generator, electrically power to the power sources 682 (e.g., to charge one or more batteries of the power system 615).

The power machine 600 may also include the control system 610. The control system 610 (e.g., the control system 160 of FIG. 1) is configured to receive operator input or other input signals (e.g., sensor data, such as speed data, position data, tilt or orientation data, or a combination thereof) and to output commands accordingly to control operation of the power machine 600. For example, the control system 610 can communicate with other systems of the power machine 600 to perform various work tasks, including to control the workgroup electric actuator 660 for performing a work task operation (e.g., a digging operation, a roading operation, etc.), another operation of the power machine 600, or a combination thereof.

In some configurations, the control system 610 receives input from an operator input device, such as one of the operator input devices 262 of FIG. 2, including input as command signals provided by an operator of the power machine 405 via the operator input device 262 (also referred to herein as operator commands). As one example, an operator command or command signal may include a commanded lift for the workgroup system 620 of the power machine 600 (e.g., a change in lift of the work element 655 at which the operator of the power machine 600 requests or commands). In response to receiving the input, the control system 610 may control the power machine 600 to perform the requested operation or otherwise maneuver based at least in part on the input received from the operator input device, the sensed operation data, or a combination thereof. Accordingly, in some configurations, the control system 610 may receive an input parameter corresponding to an operator command or input associated with operating the power machine 600, sensed operation data associated with the power machine 600, or a combination thereof.

Figure 7:
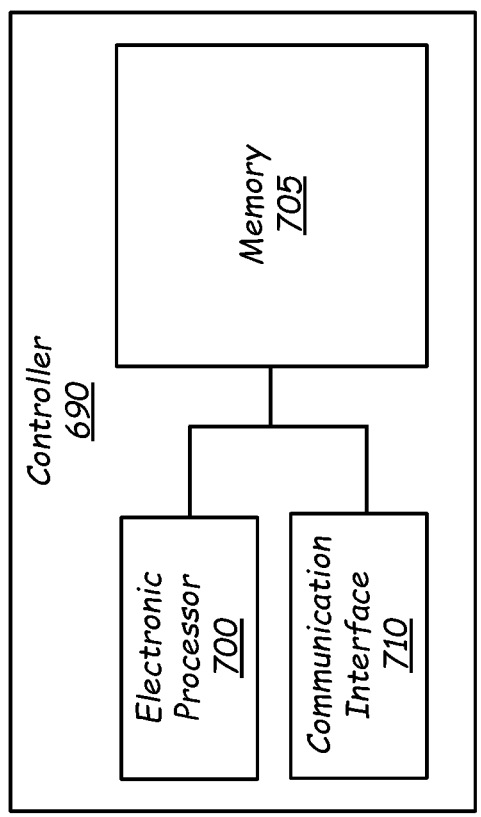
FIG. 7 schematically illustrates a controller of the power machine of FIG. 6 according to some configurations.

As illustrated in FIG. 6, the control system 610 includes a controller 690 (e.g., the control device(s) 260, 404 as described herein). FIG. 7 illustrates the controller 690 according to some configurations. In the illustrated example of FIG. 7, the controller 690 includes an electronic processor 700 (for example, a microprocessor, an application-specific integrated circuit ("ASIC"), or another suitable electronic device), a memory 705 (for example, a non-transitory, computer-readable medium), and a communication interface 710. The electronic processor 700, the memory 705, and the communication interface 710 communicate over one or more communication lines or buses. The controller 690 may include additional components than those illustrated in FIG. 7 in various configurations and may perform additional functionality than the functionality described herein. As one example, in some embodiments, the functionality described herein as being performed by the controller 690 may be distributed among other components or devices (e.g., one or more electronic processors).

The communication interface 710 allows the controller 690 to communicate with devices external to the controller 690. For example, as illustrated in FIG. 6, the controller 690 may communicate with the workgroup system 620 (or component(s) therein), other components or systems of the power machine 600, or a combination thereof through the communication interface 710.

The communication interface 710 may include a port for receiving a wired connection to an external device (for example, a universal serial bus ("USB") cabled and the like), a transceiver for establishing a wireless connection to an external device (for example, over one or more communication networks, such as the Internet, local area network ("LAN"), a wide area network ("WAN"), and the like), or a combination thereof. In some configurations, the controller 690 can be a dedicated or stand-alone controller. In some configurations, the controller 690 can be part of a system of multiple distinct controllers (e.g., a hub controller, a drive controller, a workgroup controller, etc.) or can be formed by a system of multiple distinct controllers (e.g., also with hub, drive, and workgroup controllers, etc.), where the multiple distinct controllers communicate via a controller area network ("CAN") bus.

The electronic processor 700 is configured to access and execute computer-readable instructions ("software") stored in the memory 705. The software may include firmware, one or more applications, program data, filters, rules, one or more program modules, and other executable instructions. For example, the software may include instructions and associated data for performing a set of functions, including the methods described herein.

Figure 8:
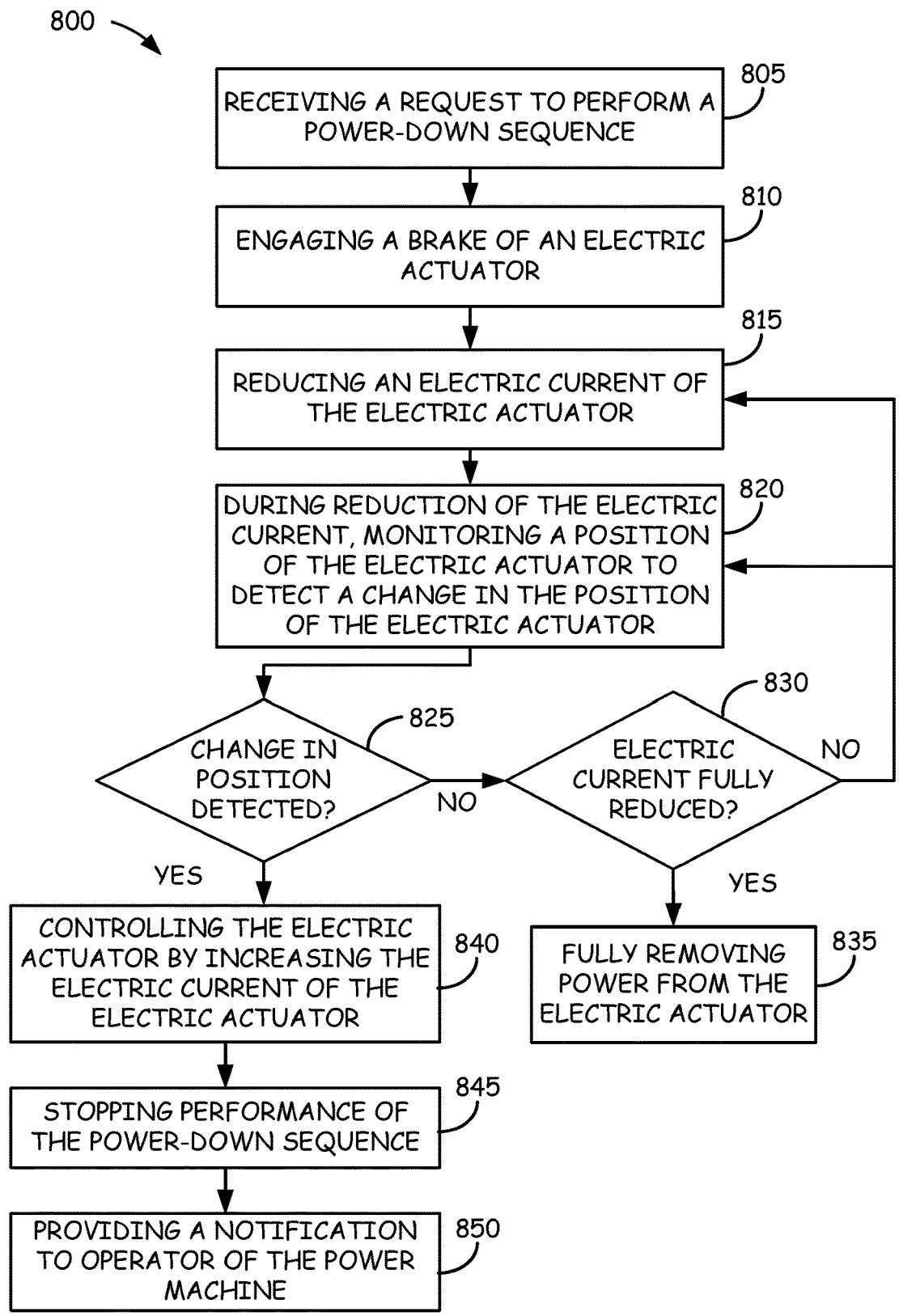
FIG. 8 is a flowchart of a method for controlling a power machine according to some implementations.

FIG. 8 is a flowchart illustrating a method 800 for controlling a power machine (e.g., the power machine 600) according to some configurations. In some configurations, the method 800 can be performed by the control system 610 (e.g., the controller 690) and, in particular, by the electronic processor 700 of the controller 690. However, as noted above, the functionality described with respect to the method 800 may be performed by other devices or can be distributed among a plurality of devices or components (e.g., one or more electronic processors).

As illustrated in FIG. 8, the method 800 may include receiving a request to perform a power-down sequence (at block 805). A power-down sequence may include one or more actions or operations that, when performed, may result in terminating the supply of power from a power source (e.g., the power source(s) 682) to one or more component(s) or system(s) of the power machine 600 (e.g., the electric lift actuator(s) 675). Accordingly, the power-down sequence may terminate power for the power machine 600 as a whole or for individual components thereof (e.g., one or more of the electric lift actuators 675). In some examples, the power-down sequence may be an emergency stop or power off sequence (e.g., an E-Stop sequence, an emergency power off ("EPO") sequence, etc.). In some examples, the method 800 may not necessarily include a request for a power-down sequence, and other operations to evaluate a brake capacity (or other performance metric) can be initiated based on other triggering events (e.g., upon activation of a brake for a lift arm or other workgroup component).

In some configurations, the request may be initiated or originate from an operator of the power machine 600 (e.g., an operator request). For instance, an operator of the power machine 600 may request performance of the power-down sequence for the power machine 600 via an operator input device (e.g., an E-Stop button or switch). As another example, when the operator wants to temporarily stop operation of the power machine 600 while a load is elevated, the operator of the power machine 600 may request performance of the power-down sequence for the electric lift actuator(s) 675, such that the electric lift actuator(s) 675 maintain the load at the elevated position.

Alternatively, or in addition, the request may be automatically initiated by the power machine 600 or a component thereof (e.g., an automatic machine request). In some examples, the request may be automatically initiated or triggered responsive to a particular event or condition (e.g., a power-down trigger). For example, in some instances, the electronic processor 700 may detect or determine a particular event or condition based on operational data. Operational data may include input received from the operator input device (e.g., operator commands), sensed operation data, or a combination thereof. An operator command may include input received via the operator input device(s) from an operator of the power machine 600. Sensed operation data may include information or data collected by one or more sensors of the power machine 600, such as, e.g., the workgroup positions sensor(s) 667. When the electronic processor 700 detects a power-down trigger, the electronic processor 700 may automatically initiate the request to perform the power-down sequence. For example, when the electronic processor 700 determines that the operational data suggests an emergency condition or situation with respect to the power machine 600 (or a component thereof), the electronic processor 700 may request performance of the power-down sequence without a manual request initiated by the operator of the power machine 600. As another example, when the electronic processor 700 determines that a seat or lap bar of the power machine 600 is lifted or that an operator of the power machine 600 interacts with a PTOL button, the electronic processor 700 may perform the disclosed method (s) (or functionality thereof), such as, e.g., automatically initiating the request to perform the power-down sequence. As yet another example, when the electronic processor 700 determines that an operator of the power machine 600 exits the power machine 600 with a load raised, the electronic processor 700 may perform the disclosed method(s) (or functionality thereof), such as, e.g., automatically initiating the request to perform the power-down sequence.

In some configurations, the electronic processor 700 may receive the request while the workgroup electric actuator 660 is in a particular position (e.g., at a particular extension amount, linear extension amount, etc.). The particular position of the workgroup electric actuator 660 at the time in which the request is received may be referred to herein as a "target position." Accordingly, a "target position" may be used herein to refer to a present position of the workgroup electric actuator 660 when the request to perform the power-down sequence is received.

As one example, the electronic processor 700 may receive the request while the electric lift actuator(s) 675 are at an extension amount such that the lift arm 670 or the work element 655 are at an elevated lift height (i.e., raised above a minimum lift height or fully-lowered stop position). As another example, when the workgroup electric actuator 660 include one or more electric tilt actuators, the electronic processor 700 may receive the request while the electric tilt actuator(s) are at an extension amount such that the work element 655 is at a particular degree of tilt from the lift arm 670. Accordingly, in some configurations, the electronic processor 700 may receive the request while the electric lift actuator(s) 675 are in an elevated position (e.g., at a position above a ground surface, raised above a bottom stop position for the workgroup system 620 (or a component thereof), etc.).

The electronic processor 700 may control a position of the electric lift actuator(s) 675 using an electric current control scheme, such that, the electronic processor 700 controls a position of the electric lift actuator(s) 675 by controlling an electric current provided to the electric lift actuator(s) 675. Accordingly, when the request to perform the power-down sequence is received, the electric lift actuator(s) 675 may be at a target position that corresponds to a present electric current being supplied to the electric lift actuator(s) 675. In some examples, however, a brake may have already been applied when a power-down sequence request is received (e.g., as supplemented by steady or intermittent current signals to a relevant actuator).

Responsive to receiving the request (e.g., at block 805), the electronic processor 700 may engage a brake (e.g., the brake 672) of the electric lift actuator(s) 675 (at block 810). In some configurations, the electronic processor 700 may engage the brake 672 by providing control signals to the brake 672, where, responsive to receiving the control signals, the brake 672 is engaged. For example, responsive to receiving a control signal from the electronic processor 700, the brake 672 may engage to stop (or prevent) movement of an associated one or more electric lift actuator 675.

After engaging the brake 672, the electronic processor 700 may reduce an electric current of the electric lift actuator 675 (at block 815). In some configurations, the electronic processor 700 may reduce the electric current of the electric lift actuator 675 below the electric current corresponding to the target position (e.g., the position of the electric lift actuator 675 when the request to perform the power-down sequence was received at block 805). In some configurations, the electronic processor 700 may continuously (or otherwise) reduce the electric current of the electric lift actuator 675, as described in greater detail herein. Thus, for example, as the brake 672 remains engaged to prevent movement of the actuator 675, the force being provided by the actuator 675 (e.g., to supplement the brake holding force) can be gradually removed.

In some configurations, the electronic processor 700 may decrease the electric current of the electric lift actuator 675 based on operator input (e.g., operator commands) provided via an operator input device of the power machine 600. Alternatively, in some configurations, the electronic processor 700 may decrease the electric current of the electric lift actuator 675 in accordance with a pre-determined sequence of electric current adjustments for the electric lift actuator 675 (e.g., continuously, at a predetermined rate). Although not illustrated, the pre-determined sequence of electric current adjustments for the electric lift actuator 675 may be stored in the memory 705 of the controller 690 of FIG. 7. In some examples, electric current can be decreased at a rate that is within a range of 1 amps/second and 5 amps/second, although other approaches are also possible.

During reduction of the electric current, the electronic processor 700 may monitor a position of the electric lift actuator 675 to detect a change in the position (or a positional deviation) of the electric lift actuator 675 from the target position (at block 820). The electronic processor 700 may detect the change in the position based on difference between a present position of the electric lift actuator 675 and the target position of the electric lift actuator 675. Accordingly, in some configurations, the electronic processor 700 may determine a present position of the electric lift actuator 675 (e.g., based on operational data associated with the power machine 600) and may compare the present position to the target position. To evaluate whether a notable change in position has occurred, the electronic processor 700 may then compare the difference between a present position of the electric lift actuator 675 and the target position of the electric lift actuator 675 to a threshold. The threshold may be a tolerance range (e.g., a permissible error range), which can be expressed as an absolute value (e.g., a particular linear or angular displacement) or as a relative value (e.g., a percentage change in position relative to a total range of travel or other reference value). As one example, the threshold range may be 0.1 inch of travel. As another example, the threshold range may be 1% change in position.

When the difference between a present position of the electric lift actuator 675 and the target position of the electric lift actuator 675 exceeds the threshold (e.g., is outside of the permissible error range), or when movement of actuator 675 satisfies other relevant criteria, the electronic processor 700 may detect that a change in the position has occurred for the brake test procedure (i.e., "Yes" at block 825). Detecting such a change in the position may indicate that the brake 672 does not have a holding capacity sufficient to hold a present load on the workgroup system 620 at the target position (e.g., to maintain the electric lift actuator(s) 675 at the target position against the force of gravity, minus any assistive load still being applied by the actuator 675). For example, as the electric current of the electric lift actuator 675 is decreased, more of the force from the load is imposed on the brake 672. When the brake 672 cannot hold the load at the target position (or within the permissible error rang of the target position), the present position of the electric lift actuators 675 may deviate from the target position (e.g., the electric lift actuators 675 may lower) as a result of the brake 672 not being able to hold the load.

In some configurations, when the electronic processor 700 detects the change in the position (e.g., Yes at block 825), the electronic processor 700 may determine a present electric current of the electric lift actuator 675 (e.g., based on operational data). The present electric current of the electric lift actuator 675 when the change in the position is detected may be proportional to or otherwise indicative of a holding capacity of the brake 672. For example, for a known loading of the workgroup (e.g., as determined based on known specifications of the power machine 600, based on load sensing implemented with the actuator 675, etc.), the static holding capacity of the brake 672 can be determined, in view of the operations above, as being equal to the force of gravity on the load, minus the opposing force applied by the lift actuator 675 when the electronic processor 700 detects the change in position. Accordingly, in some configurations, the electronic processor 700 may determine a holding capacity (e.g., a present holding capacity) for the brake 672 based on the present electric current of the electric lift actuator 675 when the change in the position is detected.

In some configurations, the present electric current of the electric lift actuator 675 when the change in the position is detected may be utilized as a threshold indicative of brake performance (e.g., as a brake performance metric). For example, the lower the electric current is when the change in the position is detected, the better the performance of the brake 672 may be (e.g., a higher holding capacity), because the brake 672 is holding more of the load instead of the electric lift actuator 675. Conversely, the electric current being relatively high when the change in the position is detected may correspond to lower performance of the brake 672 (e.g., a lower holding capacity), because the electric lift actuator 675 is holding more of the load instead of the brake 672.

When the difference between a present position of the electric lift actuator 675 and the target position of the electric lift actuator 675 does not exceed the threshold (e.g., is within the permissible error range), the electronic processor 700 may not detect the change in the position (e.g., "No" at block 825). Not detecting the change in the position may indicate that the brake 672 has the holding capacity sufficient to hold the load of the workgroup system 620 at the target position (e.g., to maintain the electric lift actuator(s) 675 at the target position).

Further in this regard, as illustrated in FIG. 8, the method 800 can accordingly include the electronic processor 700 continuously (or otherwise) reducing the electric current of the electric lift actuator 675 and monitoring for changes in position of the actuator 675. Thus, for example, the load on the workgroup that is held by the brake 672 can be increased over time to determine at what force threshold (if any) movement may occur. In such embodiments, the electronic processor 700 may continuously (or otherwise) reduce the electric current until a change in the position is detected. Alternatively, in some embodiments, the electronic processor 700 may continuously (or otherwise) reduce the electric current until the electric current is reduced to zero (e.g., when a holding capacity of the brake 672 is sufficient to hold or maintain the electric lift actuator 675 at the target position). When the electric current is reduced to zero, the force of the load of the workgroup system 620 may thus be fully imposed on the brake 672 (i.e., the brake 672 may be operated to engage the load with no assistance from the actuator 675). When the electronic processor 700 does not detect a change in the position (e.g., no positional deviation) and the electric current of the electric lift actuator 675 is reduced to zero, the electronic processor 700 may determine that the brake 672 has a holding capacity sufficient to hold the load of the workgroup system 620 at the target position.

Accordingly, as illustrated in FIG. 8, in some configurations, when the electronic processor 700 does not detect the change in the position (e.g., No at block 825), the electronic processor 700 may determine whether the electric current of the electric lift actuator 675 is fully reduced (e.g., has been reduced to zero) (at block 830). When the electronic processor 700 determines that the electric current of the electric lift actuator 675 has not been fully reduced (No at block 830), the electronic processor 700 may repeat one or more of blocks 815, 820, and 825 until, e.g., a change in position is detected (e.g., Yes at block 825) or the electric current of the electric lift actuator 675 is fully reduced (e.g., Yes at block 830). For instance, the electronic processor 700 may further reduce the electric current of the electric lift actuator 675 (e.g., by repeating block 815), monitor a position of the electric actuator to detect a change in the position of the electric lift actuator (e.g., by repeating block 820), and determine whether a change in position is detected (e.g., by repeating block 825).

In some configurations, when the electronic processor 700 determines that the electric current of the electric lift actuator 675 is fully reduced to zero (Yes at block 830), the electronic processor 700 may fully remove power from the electric lift actuator 675 (at block 835). In some instances, the electronic processor 700 may fully remove power from the electric lift actuator 675 as part of performing the power-down sequence requested at block 805. When the electronic processor 700 does not detect a change in the position (e.g., no positional deviation) and the electric current of the electric lift actuator 675 is reduced to zero, the electronic processor 700 may determine that the brake 672 has a holding capacity sufficient to hold the load of the workgroup system 620 at the target position, and, as a result, may allow (or otherwise perform) the power-down sequence as requested at, e.g., block 805. Thus, for example, not only may no electric current be provided to the actuator 675, but a power source that is configured to power the actuator 675 (or other power machine systems) can be disconnected or powered down, so that no electric current is available to be provided to the actuator 675.

Returning to block 825, when the electronic processor 700 detects the change in the position (Yes at block 825), the electronic processor 700 may control the electric lift actuator 675 by increasing the electric current of the electric lift actuator 675 (at block 840). In some configurations, the electronic processor 700 may control the electric lift actuator 675 by increasing the electric current of the electric lift actuator 675 to oppose a further change in the position of the electric lift actuator 675. For instance, detecting a change in the position (e.g., Yes at block 825) may indicate that the brake 672 does not have a holding capacity sufficient to hold a load of the workgroup system 620 at the target position (e.g., to maintain the electric lift actuator(s) 675 at the target position). Accordingly, in some configurations, responsive to detecting the change in the position, the electronic processor 700 may apply a counterforce (e.g., by increasing the electric current) so that additional movement of the electric lift actuator 675 is prevented (or mitigated—e.g., slowed to a stop). For example, the electronic processor 700 may increase the electric current of the electric lift actuator 675 to oppose (or prevent) a further change in the position of the electric lift actuator 675. In some instances, the electronic processor 700 can maintain a zero velocity (or fixed position) command to the electric lift actuator 675 after detecting the change in position. In some instances, the electronic processor 700 can correct the detected change in position by returning the workgroup or the actuator 675 to a position before the change was detected, and then maintain a zero velocity (or fixed position) command.

Further, as the change in position may indicate that the brake 672 does not have a holding capacity sufficient to hold the load of the workgroup system 620, the electronic processor 700 may stop (or prevent further) performance of the power-down sequence a requested at block 805 (at block 845). For example, rather than removing power from the actuator 675, which could result in a lowering of the workgroup despite the engagement of the brake 672, the electronic processor 700 may continue to provide power to the actuator 675 to help hold the load. Alternatively, or in addition, the electronic processor 700 may provide a notification to an operator of the power machine 600 (at block 850). The notification may indicate that the performance of the power-down sequence was stopped (or the request to perform the power-down sequence was denied). Alternatively, or in addition, the notification may indicate a holding capacity of the brake 672. Further, in some cases, the electronic processor 700 may eventually permit completion of the power-down sequence, but may first implement a controlled lowering of the workgroup to a minimum (e.g., fully lowered) position via further control of the actuator 675 (e.g., staying below a threshold lowering speed) before entirely removing power from the actuator 675.

In some instances, the electronic processor 700 may detect a fault condition for the brake 672. The electronic processor 700 may detect the fault condition based on an expected holding capacity and a present holding capacity for the brake 672. For example, the electronic processor 700 may detect a fault condition for the brake 672 when a difference between an expected holding capacity and a present holding capacity for the brake 672 exceeds a permissible range. For instance, a sufficiently elevated difference may indicate an impermissible amount of wear for the brake 672, and the electronic processor 700 may detect a fault condition for the brake 672 accordingly. In some instances, the electronic processor 700 may provide a notification to an operator of the power machine 600 indicating, e.g., the fault condition, the difference between the expected holding capacity and the present holding capacity, etc.

Figure 9:
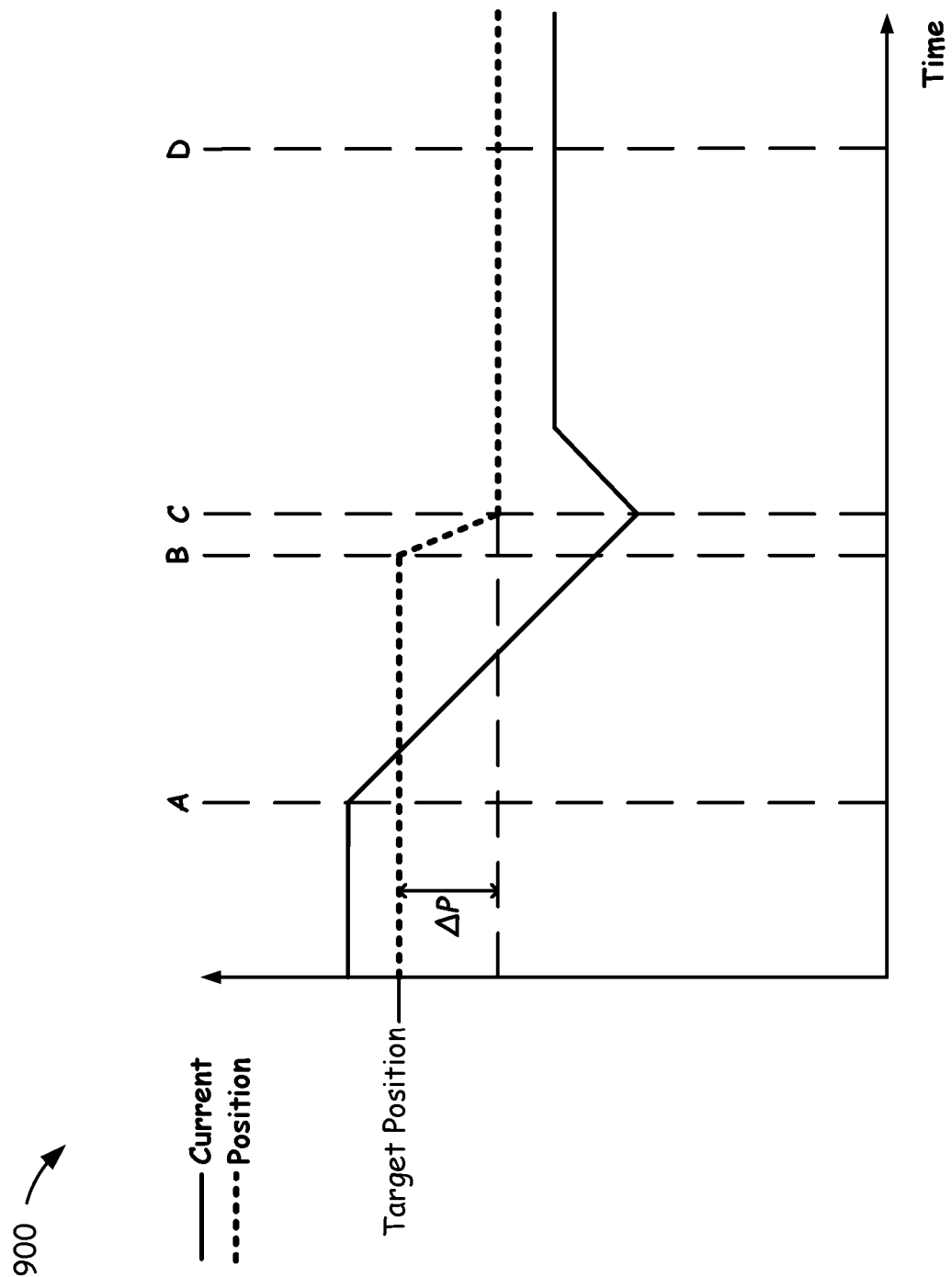
FIG. 9 is a graph illustrating a relationship between electric current and position of an electric actuator during performance of the method of FIG. 8 according to some implementations.

In different implementations, the method 800 (or operations thereof) can be implemented on a wide variety of power machines, with a wide variety of particular timings, thresholds, etc. In this regard, for example, FIG. 9 is a graph 900 illustrating a relationship between electric current and position of the electric lift actuator 675 during performance of the method 800 according to some configurations. In FIG. 9, the electric current of the electric lift actuator 675 is illustrated by a solid line and the position of the electric lift actuator 675 is illustrated by a dotted line.

As illustrated in FIG. 9, reference line "A" represents receipt of the request to perform the power-down sequence for the power machine 600 (or a component thereof) and engagement of the brake 672 (e.g., as similarly described herein with respect to blocks 805 and 810 of FIG. 8). Reference line "B" represents detection of a positional deviation from a target position as the electric current of the electric lift actuator 675 is reduced (e.g., as similarly described herein with respect to blocks 815, 820, and 825 of FIG. 8). Further, in the example of FIG. 9, ΔP may represent the threshold (e.g., a permissible error range) for the positional deviation from the target position. Thus, when the positional deviation from the target position exceeds ΔP, the change in the position may be detected.

As noted herein, the present electric current of the electric lift actuator 675 when the change in the position is detected may be proportional or indicative of a holding capacity of the brake 672. Accordingly, in some configurations, reference line "B" represents a point in time for recordation or determination of the present electric current of the electric lift actuator 675 that can ultimately inform a determination of a present holding capacity of the brake 672 (e.g., as described in greater detail above).

Also as shown in FIG. 9, reference line "C" may represent application of a counterforce by increase in the electric current of the electric lift actuator 675 (e.g., as similarly described herein with respect to block 840 of FIG. 8). Thus, for example, FIG. 9 illustrates an example increase in current at the actuator 675 to prevent further movement of the actuator 675 once the change in position, ΔP, has been detected. In some examples, as shown, rather than simply stop decreasing current at the actuator 675, the method 800 can include actively increasing the current at the actuator 675 once a change in position has been detected. Accordingly, as also discussed above, sufficient force can be attained to prevent any further (undesired) movement of the actuator 675 against the brake 672.

Still referring to FIG. 9, reference line "D" may represent notification of the operator of the power machine 600. For example, as also discussed above, if a present brake capacity is not sufficient to hold a present load on a workgroup, it may be useful to alert an operator to that condition. In some configurations, the notification may prompt the operator of the power machine 600 to lower a load of the workgroup system 620 prior to performance or completion of the power-down sequence.

Figure 10:
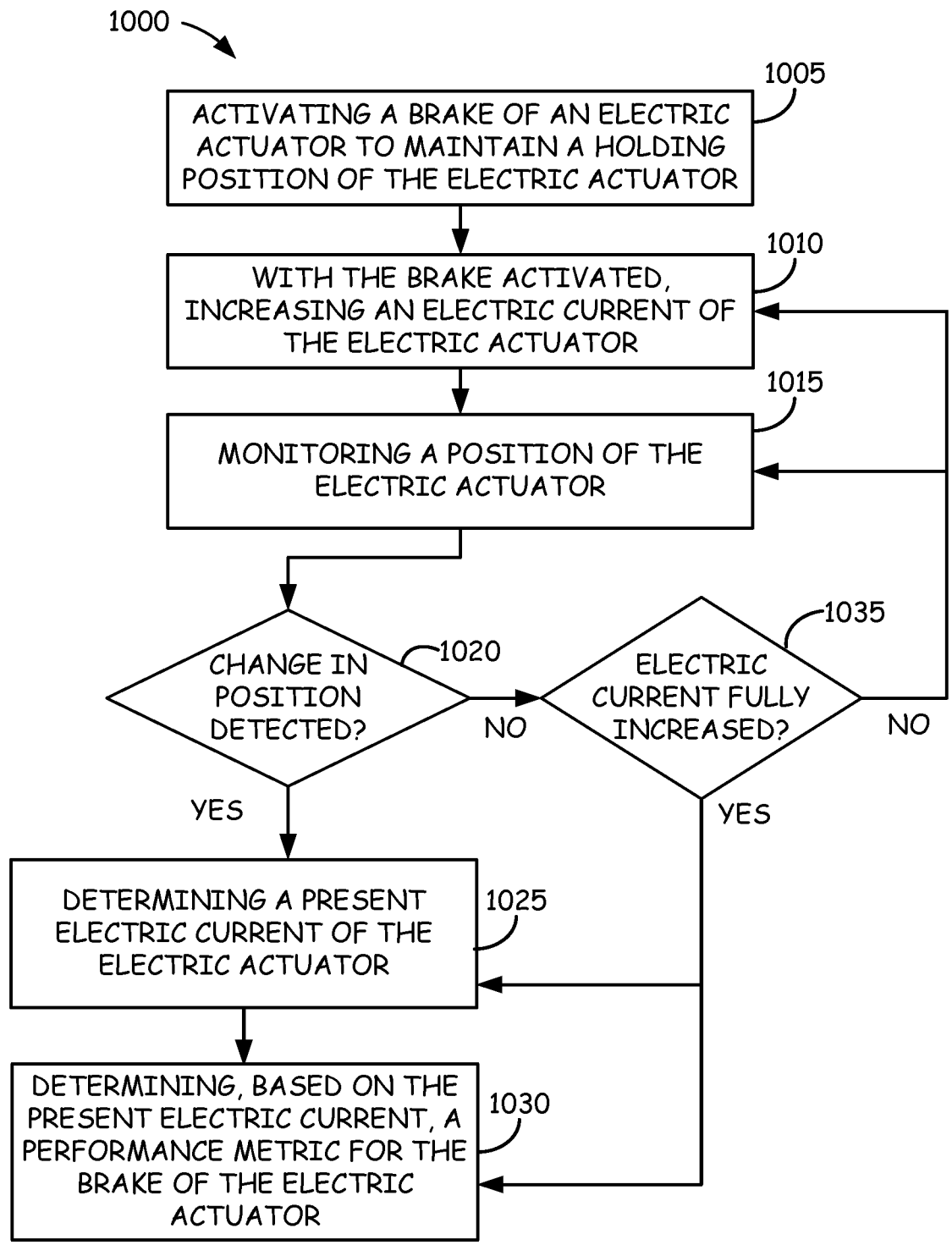
FIG. 10 is a flowchart of a method for controlling a power machine according to some implementations.

FIG. 10 is a flowchart illustrating a method 1000 for controlling a power machine (e.g., the power machine 600) according to some configurations. In some configurations, the method 1000 can be performed by the control system 610 (e.g., the controller 690) and, in particular, by the electronic processor 700 of the controller 690. However, as noted above, the functionality described with respect to the method 1000 may be performed by other devices or can be distributed among a plurality of devices or components (e.g., one or more electronic processors).

As illustrated in FIG. 10, the method 1000 may include activating the brake 672 of the electric lift actuator 675 to maintain a holding position of the electric lift actuator 675 (at block 1005). The holding position may be a target position, as described in greater detail above. In some examples, the electronic processor 700 may activate (or engage) the brake 672 of the electric lift actuator 675 to maintain the holding position (e.g., the target position) of the electric lift actuator 675 as described herein with respect to block 810 of FIG. 8. For example, the electronic processor 700 may engage the brake 672 of the electric lift actuator(s) 675 by providing control signals to the brake 672, so that, responsive to receiving the control signals, the brake 672 is engaged (or otherwise activated). Thus, 41 or example, responsive to receiving a control signal from the electronic processor 700, the brake 672 may engage to stop (or prevent) movement of an associated one or more electric lift actuator 675. In some instances, the electronic processor 700 may activate the brake 672 in response to receiving a request to perform a power-down sequence (e.g., as described herein with respect to block 805 of FIG. 8). The request to perform the power-down sequence may be an operator-initiated request, an automatic machine request, or the like. In some instances, however, other triggering events are possible (e.g., an operator request for a brake test, or a reminder or other alert corresponding to a maintenance schedule for a power machine).

At block 1010, with the brake engaged, the electronic processor 700 may increase an electric current of the electric lift actuator 675. Accordingly, in some configurations, increase in the electric current of the electric lift actuator 675 may correspond to an attempt to have the electric lift actuator 675 overcome the braking force of the brake 672, as also described in greater detail above. In some configurations, the electronic processor 700 may continuously (or otherwise) increase the electric current of the electric lift actuator 675. In such embodiments, the electronic processor 700 may continuously (or otherwise) increase the electric current until a change in the position is detected, where the change in the position may be indicative that the electric lift actuator 675 overcame the holding capacity of the brake 672, as described in greater detail herein.

In some configurations, the electronic processor 700 may increase the electric current of the electric lift actuator 675 based on operator input (e.g., operator commands) provided via an operator input device of the power machine 600. Alternatively, in some configurations, the electronic processor 700 may increase the electric current of the electric lift actuator 675 in accordance with a pre-determined sequence of electric current adjustments for the electric lift actuator 675 (e.g., continuously, at a predetermined rate). Although not illustrated, the pre-determined sequence of electric current adjustments for the electric lift actuator 675 may be stored in the memory 705 of the controller 690 of FIG. 7. In some examples, electric current can be increased at a rate that is within a range of 1 amps/second and 5 amps/second, although other approaches are also possible.

The electronic processor 700 may monitor a position of the electric lift actuator 675 (at block 1015). In some configurations, the electronic processor 700 may monitor the position (e.g., a present position) of the electric lift actuator 675 while the electric current of the electric lift actuator 675 is increased. The electronic processor 700 may monitor the position of the electric lift actuator 675 to detect a change in the position of the electric lift actuator 675 resulting from the increase in the electric current (at block 1020). The electronic processor 700 may detect the change in the position based on difference between a present position of the electric lift actuator 675 and the holding or target position of the electric lift actuator 675. Accordingly, in some configurations, the electronic processor 700 may determine a present position of the electric lift actuator 675 (e.g., based on operational data associated with the power machine 600) and may compare the present position to the target position. To evaluate whether a notable change in position has occurred, the electronic processor 700 may then compare the difference between a present position of the electric lift actuator 675 and the target position of the electric lift actuator 675 to a threshold. The threshold may be a tolerance range (e.g., a permissible error range), which can be expressed as an absolute value (e.g., a particular linear or angular displacement) or as a relative value (e.g., a percentage change in position relative to a total range of travel or other reference value). As one example, the threshold range may be 0.1 inch of travel. As another example, the threshold range may be 1% change in position.

When the difference between a present position of the electric lift actuator 675 and the target position of the electric lift actuator 675 exceeds the threshold (e.g., is outside of the permissible error range), or when movement of actuator 675 satisfies other relevant criteria, the electronic processor 700 may detect that a change in the position has occurred for the bracket test procedure (i.e., "Yes" at block 1020). Detecting such a change in the position may indicate that the electric lift actuator 675 overpowered the brake 672 (e.g., that the brake 672 cannot withstand the force imposed by the electric lift actuator 675, offset by the counter-force of gravity, as applicable). For example, as the electric current of the electric lift actuator 675 is increased, more force is imposed on the brake 672. When the brake 672 cannot maintain the target position (or within the permissible error rang of the target position), the present position of the electric lift actuators 675 may deviate from the target position as a result of the electric lift actuator 675 overcoming the holding capacity of the brake 672 (and, as applicable, the force of gravity for the relevant workgroup and present loading thereof).

In some configurations, when the electronic processor 700 detects the change in the position (e.g., Yes at block 1020), the electronic processor 700 may determine a present electric current of the electric lift actuator 675 (e.g., based on operational data) (at block 1025). The present electric current of the electric lift actuator 675 when the change in the position is detected may be proportional to or otherwise indicative of a holding capacity of the brake 672 (e.g., a present holding capacity). For example, for a known loading of the workgroup (e.g., as determined based on known specifications of the power machine 600, based on load sensing implemented with the actuator 675, etc.) and application of actuator force counter to gravitational loading, the static holding capacity of the brake 672 can be determined, in view of the operations above, as being equal to the force applied by the actuator 675, minus the opposing force applied by gravity, when the electronic processor 700 detects the change in position. Accordingly, in some configurations, the electronic processor 700 may determine a present holding capacity (e.g., as a performance metric) for the brake 672 based on the present electric current of the electric lift actuator 675 when the change in the position is detected (at block 1030). In some examples, the present electric current of the electric lift actuator 675 may correspond to the change in position (or a positional deviation from a first position to a second position of the electric lift actuator 675). For instance, a magnitude or amount of the change in position (or the positional deviation) may impact the present electric current of the electric lift actuator 675. For example, a first positional deviation may result in a first electric current of the electric lift actuator 675 while a second, different positional deviation may result in a second, different electric current of the electric lift actuator 675.

In some configurations, after increasing the electric current of the electric lift actuator 675, the electronic processor 700 may decrease the electric current of the electric lift actuator 675 such that movement of the electric lift actuator 675 is prevented by the brake 672. In other words, upon detecting a change in position at block 1020, the electronic processor 700 may operate to reduce the force applied by the electric lift actuator 675 so that further movement is prevented. In some such cases, reducing actuator force to zero may thus proceed according to one or more operations of the method 800 (see FIG. 8), including as may help to ensure that removal of power from the actuator 675 does not result in unexpected lowering of the workgroup.

Returning to block 1020, in some configurations, when the electronic processor 700 does not detect the change in the position (e.g., "No" at block 1020), the electronic processor 700 may determine whether an electric current of the electric lift actuator 675 may be further increased (at block 1035). When the electric current of the electric lift actuator 675 can be further increased (e.g., "Yes" at block 1035), the method 1000 may repeat one or more of the steps of the process (e.g., one or more of blocks 1010, 1015, 1020, etc.). For instance, as noted herein, in some configurations, the electronic processor 700 may continuously (or otherwise) increase the electric current of the electric lift actuator 675 until, e.g., a change in position is detected. In some configurations, when the electric current of the electric lift actuator 675 cannot be further increased (e.g., "No" at block 1035), the electronic processor 700 may stop increasing the electric current of the electric lift actuator 675, and determine a present electric current of the electric lift actuator 675, determine a performance metric for the brake 672 of the electric lift actuator 675, or a combination thereof (e.g., perform one or more of blocks 1025 and 1030).

In some configurations, the electronic processor 700 may detect a fault condition when the present electric current of the electric actuator (e.g., as determined at block 1025) is below a threshold. The threshold may represent a minimum acceptable holding capacity for the brake 672 (with appropriate offsets for gravitational loading, as appropriate), such that electric currents below the threshold indicate a low holding capacity for the brake 672. In some instances, the threshold may be set based on an expected holding capacity for the brake 672. When the electronic processor 700 detects the fault condition, the electronic processor 700 may provide a fault warning to an operator of the power machine 600. The fault warning may indicate that the fault condition occurred, the present electric current (e.g., as determined at block 1025), other information related to the fault condition, and the like.

In some configurations, the electronic processor 700 may determine a dynamic brake capacity for the brake 672. For instance, after detecting the change in the position (e.g., "Yes" at block 1020) or when the actuator 675 is otherwise moving against the holding power of the brake 672, the electronic processor 700 may continue to provide electric current to the electric lift actuator 675 (e.g., over a predetermined amount of time) to move the electric lift actuator 675 to a subsequent holding position of the electric lift actuator 675. The electronic processor 700 may determine the dynamic brake capacity for the brake 672 based on the provided electric current, the amount of time to move the electric lift actuator 675 to the subsequent holding position (e.g., how long it took the electric lift actuator 675 to reach the subsequent holding position), the subsequent holding position, gravitational loading on the workgroup and the actuator 675 (as applicable), etc. In this regard, for example, the smaller the amount of time to move the electric lift actuator 675 to the subsequent holding position, the smaller the dynamic brake capacity of the brake 672. Conversely, the larger the amount of time to move the electric lift actuator 675 to the subsequent holding position, the greater the dynamic brake capacity of the brake 672. Accordingly, in some configurations, the dynamic brake capacity of the brake 672 may be indicated based on an amount of time it takes to move the electric lift actuator 675 to the subsequent holding position under application of a particular force or force profile by the lift actuator 675. In some configurations, the electronic processor 700 may provide a notification or indication of the dynamic brake capacity to an operator of the power machine 600.

In some configurations, the electronic processor 700 may determine, based on the performance metric, a force threshold for the electric lift actuator 675. The force threshold may represent a maximum holding capacity of the brake 672. In some instances, the maximum holding capacity may be a present holding capacity of the brake 672, as described in greater detail herein. For example, the maximum holding capacity may be specific to the brake 672 based on, e.g., an amount of wear or use of the brake 672. Accordingly, in some instances, the force threshold may be specific to the brake 672. In some examples, the electronic processor 700 may control a subsequent electric current of the electric lift actuator 675 based on the force threshold for the brake 672 of the electric lift actuator 675 such that the subsequent electric current is maintained within the force threshold to prevent an over-loading event for the brake 672.

Figure 11:
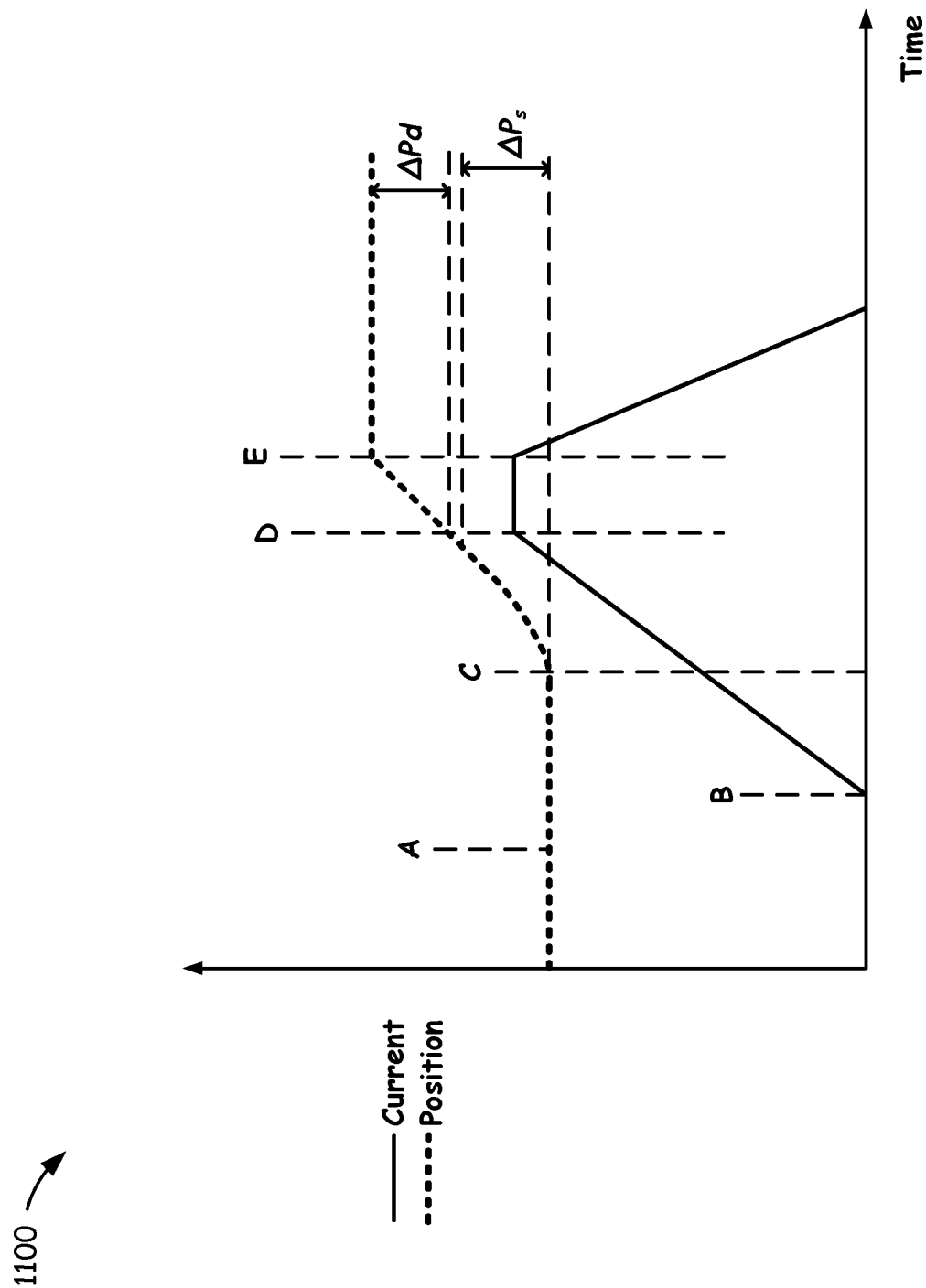
FIG. 11 is a graph illustrating a relationship between electric current and position of an electric actuator during performance of the method of FIG. 9 according to some implementations.

In different implementations, the method 800 (or operations thereof) can be implemented on a wide variety of power machines, with a wide variety of particular timings, thresholds, etc. In this regard, for example, FIG. 11 is a graph 1100 illustrating a relationship between electric current and position of the electric lift actuator 675 during performance of the method 1000 according to some configurations. In FIG. 11, the electric current of the electric lift actuator 675 is illustrated by a solid line and the position of the electric lift actuator 675 is illustrated by a dotted line.

As illustrated in FIG. 11, reference line "A" represents engagement of the brake 672 (e.g., as similarly described herein with respect to blocks 805 and 810 of FIG. 8) while there is no electric current to the electric lift actuator 675. Reference line "B" represents the electric current of the electric lift actuator 675 being increased to provide force to work against the brake 672. Reference line "C" represents the point at which the electric lift actuator 675 starts to move (e.g., as may be indicated in some cases by greater than a threshold level of movement, as discussed relative to FIG. 9). As also discussed above, the present electric current of the electric lift actuator 675 when the electric lift actuator 675 starts to move (i.e., at reference line C) provides a force that is proportional to a static loading holding capacity of the brake 672 (with appropriate offsets for gravity, as appropriate).

Within the space between reference lines "D" and "E," the dynamic braking capacity can be measured. In some cases, the dynamic braking capacity can be measured with the electric current held substantially constant while the electric lift actuator 675 is in motion, although other current profiles are also possible. In some cases, a varied electric current (and force) can be used, as desired. In this regard, actual dynamic testing of a brake may be preceded by a transient period, e.g., in which the relevant actuator is beginning to overcome the brake force and thus beginning to move from stationary. In this regard, in the example of FIG. 11, evaluation of the dynamic holding capacity of the brake 672 may occur over the change in position ΔPd, and after an initial change in position ΔPs (e.g., between 0.1 and 0.2 inch). Thus, for example, the transient behavior of the brake 672 during the transition between stationary and moving (i.e., as between lines C and D, in the illustrated example) may be ignored in some cases to ensure that a more representative dynamic performance of the brake 672 is assessed (i.e., as between lines D and E, in the illustrated example). In some instances, the change in position ΔPd may be over a larger value and may be based on an amount of time between lines D and E. Accordingly, in some configurations, the electric current is held for a period of time and the ΔPd may be measured during that period of time. Alternatively, or in addition, in some configurations, the ΔPd may be detected and an amount of time to achieve the ΔPd may be measured, where the ΔPd may be between, e.g., four and eight times the ΔPs measurement.

In the illustrated example, reference line "E" represents the ramping down (e.g., decreasing) of the electric current to the electric lift actuator 675 once the dynamic braking capacity has been tested. As illustrated in FIG. 11, the motion of the electric lift actuator 675 may in some cases stop due to the static brake holding, including as the current at the actuator 675 is decreased to zero. In other examples, current at the actuator 675 may be otherwise decreased or maintained, including to supplement the holding force of the brake 672 to prevent undesired lowering of the load (e.g., as also discussed relative to FIG. 9).

Figure 12:
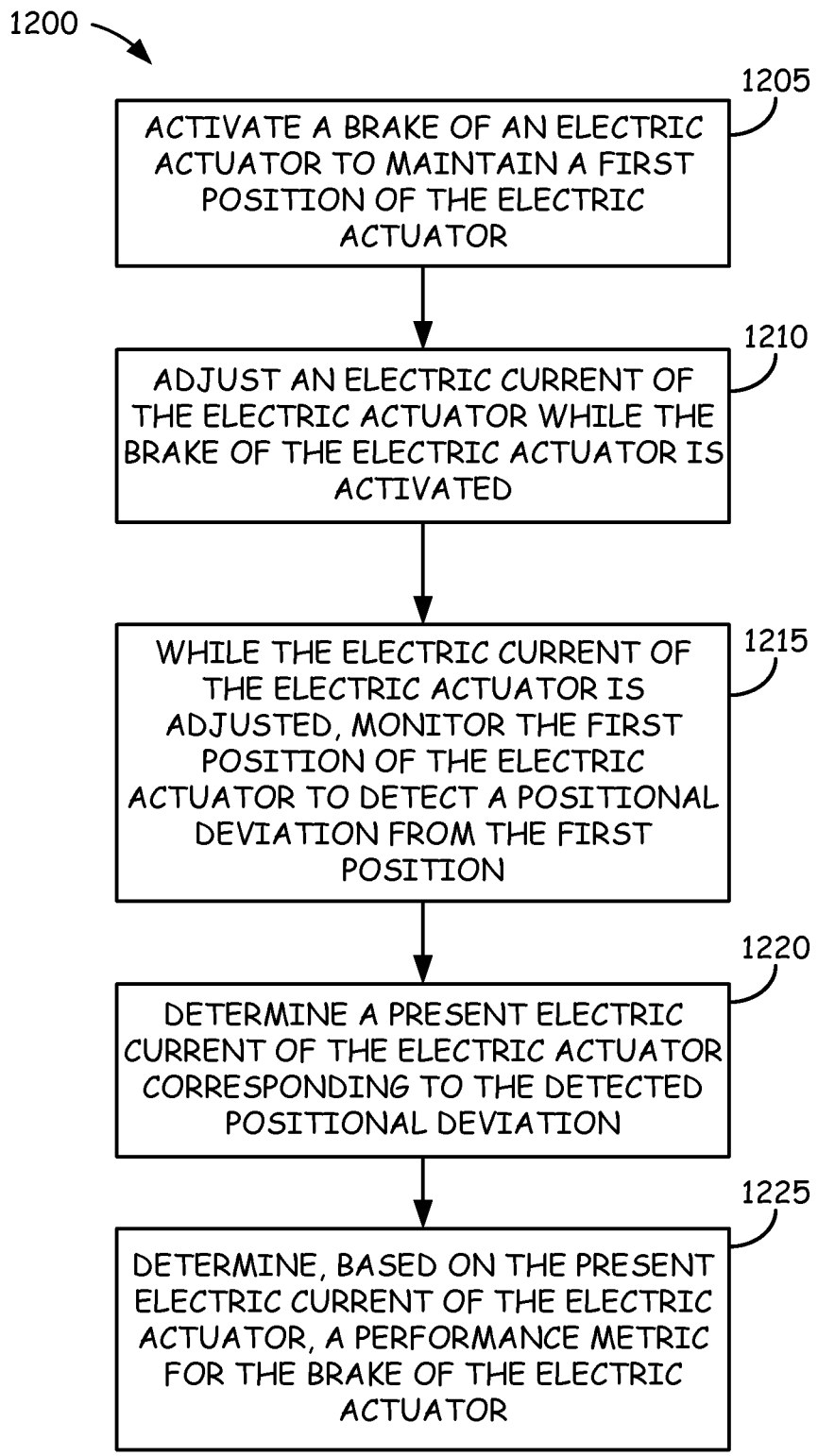
FIG. 12 is a flowchart of a method for controlling a power machine according to some implementations.

Thus, control of current for a particular actuator (e.g., the lift actuator 675) can be used to evaluate a corresponding brake and determine potential fault conditions for a power machine. FIGS. 8 through 11 provide specific examples in this regard, corresponding to particular implementations. In this regard, however, more general approaches for evaluating brake characteristics are also possible. For example, FIG. 12 is a flowchart illustrating a method 1200 for controlling a power machine (e.g., the power machine 600) according to some configurations. In some configurations, the method 1200 can be performed by the control system 610 (e.g., the controller 690) and, in particular, by the electronic processor 700 of the controller 690. However, as noted above, the functionality described with respect to the method 1200 may be performed by other devices or can be distributed among a plurality of devices or components (e.g., one or more electronic processors).

As illustrated in FIG. 12, the method 1200 may include activating the brake 672 of the electric lift actuator 675 to maintain a first position (e.g., a target position or a holding position) of the electric lift actuator 675 (at block 1205). In some configurations, the electronic processor may activate the brake 672 of the electric lift actuator 675 as similarly described in greater detail herein with respect to, e.g., block 810 of FIG. 8 or block 1005 of FIG. 10. While the brake 672 of the electric lift actuator 675 is activated, the electronic processor may adjust an electric current of the electric lift actuator 675 (at block 1210).

In some configurations, the electronic processor 700 may adjust the electric current of the electric lift actuator 675 as similarly described herein with respect to one or more of the operations of FIGS. 8-11. For instance, in some configurations, the electronic processor 700 may adjust the electric current of the electric lift actuator 675 by decreasing the electric current of the electric lift actuator 675 (as similarly described herein with respect to block 840 of FIG. 8). In such configurations, responsive to detecting the positional deviation, the electronic processor 700 may control the electric lift actuator 675 of the power machine 600 by increasing the electric current of the electric lift actuator 675 to maintain a second position of the electric lift actuator 675, where the second position may be a position resulting from the positional deviation from the first position. In some configurations, the electronic processor 700 may adjust the electric current of the electric lift actuator 675 by increasing the electric current of the electric lift actuator 675 (as similarly described herein with respect to block 1010 of FIG. 10).

In some configurations, the electronic processor 700 may adjust the electric current of the electric lift actuator 675 based on operator input (e.g., operator commands) provided via an operator input device of the power machine 600. Alternatively (or additionally), in some configurations, the electronic processor 700 may adjust the electric current of the electric lift actuator 675 in accordance with a pre-determined sequence of electric current adjustments for the electric lift actuator 675 (e.g., according to a predetermined rate of increase or other electrical current profile over time). Although not illustrated, the pre-determined sequence of electric current adjustments for the electric lift actuator 675 may be stored in the memory 705 of the controller 690 of FIG. 7.

While the electric current of the electric lift actuator 675 is adjusted, the electronic processor 700 may monitor the first position of the electric lift actuator 675 to detect a positional deviation from the first position (at block 1215). In some configurations, the electronic processor 700 may monitor the first position of the electric lift actuator 675 to detect the positional deviation from the first position as similarly described herein with respect to FIGS. 8-11 (including, e.g., blocks 820 and 825 of FIG. 8 and blocks 1015 and 1020 of FIG. 10).

The electronic processor 700 may determine a present electric current of the electric actuator corresponding to the detected positional deviation (at block 1220). In some configurations, the electronic processor 700 may determine the present electric current of the electric actuator as similarly described herein with respect to FIGS. 8-11 (including, e.g., block 1025 of FIG. 10). The electronic processor 700 may determine, based on the present electric current of the electric lift actuator 675, a performance metric for the brake 672 of the electric lift actuator 675 (at block 1225), e.g., metrics including a static holding capacity, a dynamic holding capacity, or others. In some configurations, the electronic processor 700 may determine the performance metric (e.g., a holding capacity) for the brake 672 of the electric lift actuator 675 as similarly described herein with respect to FIGS. 8-11 (including, e.g., block 1030 of FIG. 10).

Thus, systems and methods according to the disclosed technology can provide improved control of electronically powered power machines. In some cases, for example, an electrical actuator (e.g., lift actuator) can be controlled to reduce or to increase force applied relative to an engaged brake for a workgroup component (e.g., lift arm), and various performance metrics of the brake can be determined accordingly. As appropriate, operators of the power machines can then be alerted to potential faults (e.g., brakes with degraded holding capacity) or automated sequences (e.g., power-down sequences) can be adjusted accordingly.

Unless otherwise specified or limited, the terms "about" and "approximately," as used herein with respect to a reference value, refer to variations from the reference value of ±15% or less, inclusive of the endpoints of the range. Similarly, the term "substantially," as used herein with respect to a reference value, refers to variations from the reference value of ±5% or less, inclusive of the endpoints of the range.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

In some embodiments, aspects of the technology disclosed herein, including computerized implementations of methods according to the technology disclosed herein, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the technology disclosed herein can be implemented as a set of instructions, tangibly embodied on a non-transitory computer-readable media, such that a processor device can implement the instructions based upon reading the instructions from the computer-readable media. Some embodiments of the technology disclosed herein can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). In some embodiments, a control device can include a centralized hub controller that receives, processes and (re) transmits control signals and other data to and from other distributed control devices (e.g., an engine controller, an implement controller, a drive controller, etc.), including as part of a hub-and-spoke architecture or otherwise.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the technology disclosed herein, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the technology disclosed herein. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise limited or defined, "substantially parallel" indicates a direction that is within ±12 degrees of a reference direction (e.g., within ±6 degrees or ±3 degrees), inclusive. Correspondingly, "substantially vertical" indicates a direction that is substantially parallel to the vertical direction, as defined relative to the reference system (e.g., for a power machine, as defined relative to a horizontal support surface on which the power machine is operationally situated), with a similarly derived meaning for "substantially horizontal" (relative to the horizontal direction). Similarly, as used herein, unless otherwise limited or defined, "substantially perpendicular" indicates a direction that is within ±12 degrees of perpendicular a reference direction (e.g., within ±6 degrees or ±3 degrees), inclusive.

Also as used herein, unless otherwise limited or defined, "current" is generally used as a temporal measure, i.e., to indicate a present value (e.g., a present position, load, etc.). In contrast, "electric current" is used to refer to the flow of electric charge in electric systems.

Although the present technology has been described with reference to preferred embodiments, workers skilled in the art will recognize that changes may be made in form and detail to the disclosed embodiments without departing from the spirit and scope of the concepts discussed herein.

What is claimed is:

1. A system for controlling an electric power machine, the system comprising:
   one or more electronic processors in electrical communication with an electric actuator of the electric power machine and configured to:
      activate a brake of the electric actuator to maintain a first position of the electric actuator;
      adjust an electric current of the electric actuator while the brake of the electric actuator is activated;
      while the electric current of the electric actuator is adjusted, monitor the first position of the electric actuator to detect a positional deviation from the first position;
      determine a present electric current of the electric actuator corresponding to the detected positional deviation; and
      determine, based on the present electric current of the electric actuator, a performance metric for the brake of the electric actuator.

2. The system of claim 1, wherein the one or more electronic processors are configured to adjust the electric current by reducing the electric current until the positional deviation is detected or the electric current is equal to zero.

3. The system of claim 1, wherein the one or more electronic processors are configured to:
   adjust the electric current of the electric actuator by decreasing the electric current of the electric actuator; and
   responsive to detecting the positional deviation,
      control the electric actuator of the electric power machine by increasing the electric current of the electric actuator to maintain a second position of the electric actuator that results from the positional deviation from the first position.

4. The system of claim 1, wherein the one or more electronic processors are configured to adjust the electric current of the electric actuator by increasing the electric current of the electric actuator.

5. The system of claim 1, wherein the one or more electronic processors are configured to adjust the electric current of the electric actuator based on: (a) operator input provided via an operator input device; or (b) a pre-determined sequence of electric current adjustments for the electric actuator.

6. A system for controlling an electric power machine, the system comprising:
   one or more electronic processors in electrical communication with an electric actuator of the electric power machine and configured to:
      receive a request to perform a power-down sequence for the electric power machine or the electric actuator, while the electric actuator is in a first position corresponding to a first electric current of the electric actuator; and
      in response to receiving the request:
         engage a brake of the electric actuator; and
         after engaging the brake, reduce an electric current of the electric actuator below the first electric current;
         during reduction of the electric current, monitor a position of the electric actuator to detect a positional deviation of the electric actuator from the first position; and
         responsive to detecting the positional deviation, control the electric actuator by increasing the electric current of the electric actuator to oppose a further change in the position of the electric actuator.

7. The system of claim 6, wherein the one or more electronic processors are further configured to:
   detect the positional deviation based on determining whether a difference between a present position of the electric actuator and the first position exceeds a threshold; and
   responsive to the difference remaining within the threshold, fully removing power from the electric actuator as part of the power-down sequence for the electric power machine.

8. The system of claim 6, wherein the one or more electronic processors are further configured to, responsive to detecting the positional deviation:
   stop the power-down sequence for the electric power machine; and
   provide a notification that the power-down sequence was stopped.

9. The system of claim 6, wherein the one or more electronic processors are further configured to:
   determine a present electric current of the electric actuator when the positional deviation is detected; and determine, based on the present electric current, a holding capacity for the brake.

10. The system of claim 9, wherein the one or more electronic processors are further configured to:
    detect a fault condition for the brake based on the determined holding capacity for the brake and an expected holding capacity for the brake.

11. The system of claim 6, wherein the electric actuator is an electric lift actuator of a lift arm assembly and the first position is a first lift position.

12. A system for controlling an electric power machine, the system comprising:
    one or more electronic processors in electrical communication with an electric actuator of the electric power machine and configured to:
        activate a brake of the electric actuator to maintain a holding position of the electric actuator;
        with the brake activated, increase an electric current of the electric actuator;
        monitor a position of the electric actuator to detect a positional deviation of the electric actuator resulting from the increase in the electric current;
        determine a present electric current of the electric actuator when the positional deviation is detected; and
        determine, based on the present electric current, a performance metric for the brake of the electric actuator.

13. The system of claim 12, wherein the one or more electronic processors are further configured to:
    detect a fault condition when the present electric current of the electric actuator is below a threshold; and
    provide a fault warning to an operator of the electric power machine when the fault condition is detected.

14. The system of claim 12, wherein the one or more electronic processors are further configured to:
    after detecting the positional deviation,
        continue to provide electric current to the electric actuator over an amount of time, to move the electric actuator to a subsequent holding position of the electric actuator; and
        determine a dynamic brake capacity for the brake based on the provided electric current.

15. The system of claim 12, wherein the one or more electronic processors are further configured to:
    after increasing the electric current and monitoring the position, decrease the electric current of the electric actuator such that movement of the electric actuator is prevented by the brake.

16. The system of claim 12, wherein the one or more electronic processors are further configured to:
    determine, based on the performance metric, a force threshold for the electric actuator, wherein the force threshold represents a maximum holding capacity of the brake; and
    control, based on the force threshold, a subsequent electric current of the electric actuator such that the subsequent electric current is maintained within the force threshold to prevent an over-loading event for the brake.

17. The system of claim 12, wherein the performance metric is a present holding capacity of the brake.

* * * * *